United States Patent
Stanczak et al.

(10) Patent No.: US 9,232,407 B2
(45) Date of Patent: Jan. 5, 2016

(54) FUNCTION VARIABLE VALUE TRANSMITTER, FUNCTION RECEIVER AND SYSTEM

(75) Inventors: Slawomir Stanczak, Berlin (DE); Mario Goldenbaum, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 508 days.

(21) Appl. No.: 13/542,873

(22) Filed: Jul. 6, 2012

(65) Prior Publication Data

US 2013/0176872 A1     Jul. 11, 2013

Related U.S. Application Data

(63) Continuation of application No. PCT/EP2010/070752, filed on Dec. 27, 2010.

(30) Foreign Application Priority Data

Jan. 7, 2010   (DE) .......................... 10 2010 000 735

(51) Int. Cl.
*H04L 12/28* (2006.01)
*H04W 24/00* (2009.01)
(Continued)

(52) U.S. Cl.
CPC ............. *H04W 24/00* (2013.01); *H04L 1/02* (2013.01); *H04L 1/06* (2013.01); *H04L 25/0202* (2013.01); *H04L 2001/0093* (2013.01)

(58) Field of Classification Search
USPC ......... 370/335, 336, 343, 344, 436, 437, 441, 370/442, 461, 462, 329, 326, 324, 304, 270, 370/265–267, 350
See application file for complete search history.

(56) References Cited

U.S. PATENT DOCUMENTS

| | | | |
|---|---|---|---|
| 2002/0105464 A1* | 8/2002 | Bevington | .................... 342/376 |
| 2005/0201446 A1 | 9/2005 | Bar-Ness et al. | |

(Continued)

FOREIGN PATENT DOCUMENTS

| | | |
|---|---|---|
| JP | 2007-528679 A | 10/2007 |
| JP | 2009-159584 A | 7/2009 |
| WO | 2008/110801 A2 | 9/2008 |

OTHER PUBLICATIONS

Official Communication issued in International Patent Application No. PCT/EP2010/070752, mailed on May 9, 2011.

(Continued)

*Primary Examiner* — Zewdu A Beyen
(74) *Attorney, Agent, or Firm* — Keating & Bennett, LLP

(57) ABSTRACT

A transmitter-side estimation of the complex channel influence between function variable value transmitters and function receivers is limited to the estimation of the magnitude of the channel influence, so that a pre-distortion of the symbols of the symbol sequences depends on an inverse of the magnitude of the channel influence, but is independent of a phase of the channel influence. Easing the channel estimation does not change the central tendency of the calculated function results transmitted over the multiple channel. Alternatively, on the side of the function receiver, a statistical quantity describing the multiple-access channel is determined. For this purpose, it is sufficient when the function variable value transmitters transmit constant power signals over the multiple-access channel in a channel estimation phase. Thus, the channel estimation effort is transferred to the function receiver and hence occurs less frequently, which again reduces the overall energy expenditure.

16 Claims, 11 Drawing Sheets

(51) Int. Cl.
*H04L 1/02* (2006.01)
*H04L 1/06* (2006.01)
*H04L 25/02* (2006.01)
*H04L 1/00* (2006.01)

(56) References Cited

U.S. PATENT DOCUMENTS

2006/0039488 A1* 2/2006 Wu et al. .................. 375/260
2007/0243827 A1* 10/2007 Sayeed et al. ............ 455/67.11
2009/0168677 A1 7/2009 Kang et al.

OTHER PUBLICATIONS

Goldenbaum et al., "Computing Functions via SIMO Multiple-Access Channels: How Much Channel Knowledge is Needed?," IEEE International Conference on Acoustics, Speech, and Signal Processing (ICASSP), Mar. 2010, 4 pages, Dallas, TX.

Goldenbaum et al., "On Function Computation via Wireless Sensor Multiple-Access Channels," IEEE Conference on Wireless Communications & Networking Conference (WCNC), Apr. 5, 2009, 6 pages, Budapest, Hungary.

Nazer et al., "Computation Over Multiple-Access Channels," IEEE Transactions on Information Theory, vol. 53, No. 10, Oct. 2007, pp. 3498-3507.

Senol et al., "Performance of Distributed Estimation Over Unknown Parallel Fading Channels," IEEE Transactions on Signal Processing, vol. 56, No. 12, Dec. 2008, pp. 6057-6068.

Yiu et al., "Nonorthogonal Transmission and Noncoherent Fusion of Censored Decisions," IEEE Transactions on Vehicular Technology, vol. 58, No. 1, Jan. 2009, pp. 263-273.

Smith et al., "Distributed Estimation Over Fading Macs with Multiple Antennas at the Fusion Center," IEEE Asilomar Conference on Signals, Systems and Computers, Nov. 1, 2009, pp. 424-428.

Official Communication issued in corresponding Japanese Patent Application No. 2012-547486, mailed on Oct. 8, 2013.

* cited by examiner

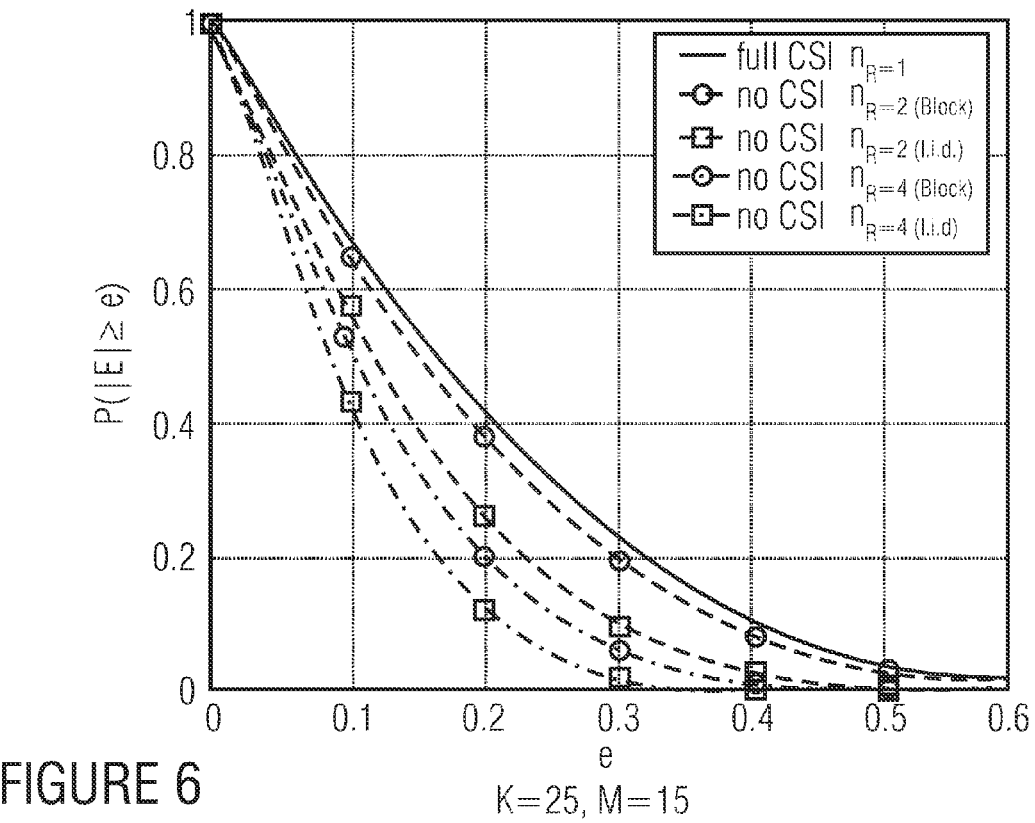
FIGURE 6  K=25, M=15
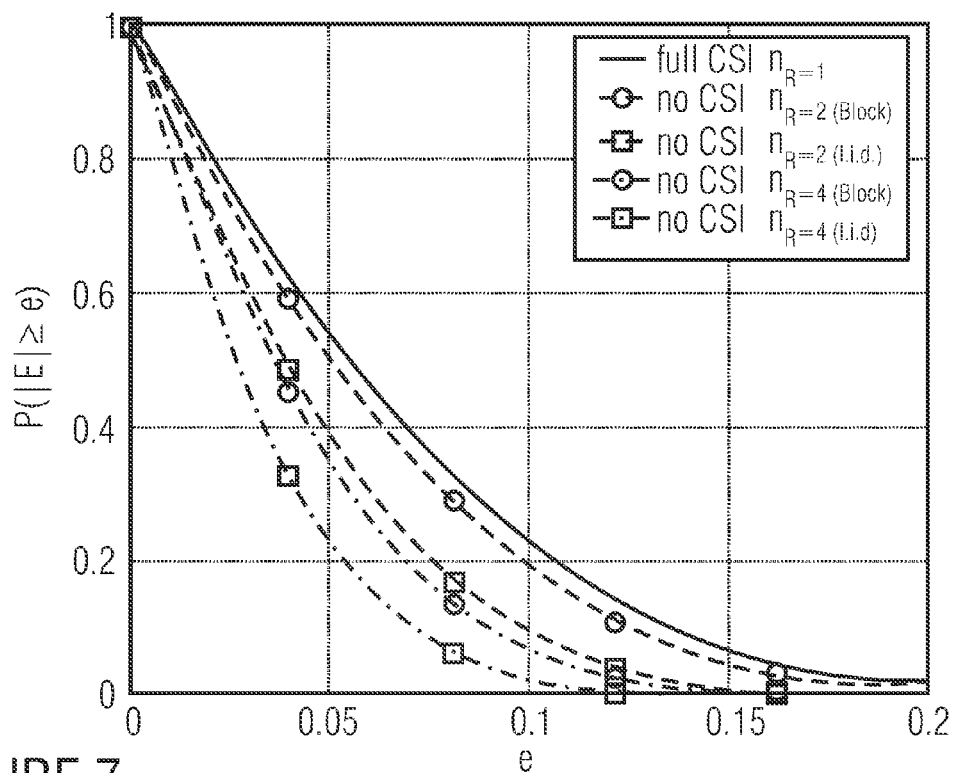
FIGURE 7  K=250, M=150

FUNCTION VARIABLE VALUE TRANSMITTER, FUNCTION RECEIVER AND SYSTEM

CROSS-REFERENCE TO RELATED APPLICATIONS

This application is a continuation of copending International Application No. PCT/EP2010/070752, filed Dec. 27, 2010, which is incorporated herein by reference in its entirety, and additionally claims priority from German Application No. DE 102010000735.8, filed Jan. 7, 2010, which is also incorporated herein by reference in its entirety.

BACKGROUND OF THE INVENTION

The present invention relates to a function variable value transmitter, a function receiver and respective systems made up of the same, such as sensor networks.

Modern wireless "sensor networks" consists of a very large number of inexpensive assemblies or sensor nodes which are interconnected via a wireless communication interface. Due to the wireless network aspect, the same differ significantly from a mere assembly of sensors, since the associated capabilities regarding cooperation, coordination and collaboration extremely broaden the radius of application.

Compared to conventional data networks, such as the internet, whose primary object is to provide an end-to-end information traffic, sensor networks are usually extremely application-specific, which means that the same are explicitly developed and used for fulfilling specific tasks. Examples for this are, exemplarily, surroundings monitoring, monitoring of physical phenomenons, building security, quality control, etc. Compared to the above-mentioned conventional data networks, this application driven characteristics of wireless sense networks necessitates completely new design paradigms.

In many sensor network applications, a unique receiving node (access point) sometimes also referred to as collecting node or central processing unit is not interested in reconstructing the individual measurement values of the nodes within the network, but is frequently interested in a desired function $f$ which depends, linearly or non-linearly, either on the entirety of all measurement values or on a specific subset. Desired functions can be, for example, the arithmetic average, the geometric average, the maximum measurement value, the minimum measurement value, the harmonic average, a weighted sum of the measurement data, a number of sensor nodes that are active within the network, etc.

Thus, it would be desirable to calculate desired linear and nonlinear functions in wireless sensor networks with as little energy expenditure as possible for increased network lifetime, heavily reduced complexity, as little coordination as possible and with simple implementation effort.

In other words, the problem is to transmit function variable values resulting at function variable value transmitters as effectively as possible to a function receiver. Based on FIG. 1, the problem will be illustrated again. FIG. 1 shows exemplarily a sensor network with sensor nodes $10_1, 10_2, 10_3, \ldots, 10_k, 10_{k+1}, \ldots, 10_K$ as well as a receiving node 12. According to the sensor network example of FIG. 1, the K sensor nodes $10_1 \ldots 10_K$ are spatially arranged around the indicated receiving node 12 in a distributed manner. It is the object of the sensor network to reliably calculate the function $f(X_1(t), \ldots, X_K(t))$ at the location of the receiving node, wherein $X_1(t), \ldots, X_K(t)$ represent the values of the individual sensors measured at the time t.

In order to adequately solve the problem of function value computation, it is possible to strictly separate the processes of "measurement value transmission" or transmission of function variable values to the receiver on the one hand and "function value computation" on the other hand in the wireless sensor network of FIG. 1. This means that every sensor node $10_1 \ldots 10_K$ would transmit its measurement values information for example in a quantized manner and separately as digital bitstream to the receiving node 12. The same would then reconstruct the respective measurement value from the individual receive signals and would subsequently calculate the desired function, for example in an internally existing microprocessor.

The inherent characteristic of every wireless channel is, however, the occurrence of interference as soon as different users simultaneously access common resources, such as bandwidth and/or transmission time. A separation of the signals at the receiving node can normally only be realized with high effort or is not possible at all. For accommodating these circumstances, in wireless sense networks as the one in FIG. 1, it is possible to use "orthogonalizing" methods, such as TDMA (Time Division Multiple Access), according to which a specific transmission time could be allocated to every individual sensor node $10_1$-$10_K$, in which the existing resources can exclusively be used by the same. It is obvious that such an approach necessitates a high degree of coordination, in order to ensure that every node $10_1$-$10_K$ is addressed, is informed when it is assigned what time slot, etc. The coordination would have to be taken on by a specific protocol structure which would provide for the allocation and time synchronization by respective additional effort, such as signalizing messages, acknowledgement signals, etc. However, such a procedure significantly reduces the flexibility and life time of a sensor network and is hence extremely suboptimal in the context of function value computation. Additionally, the transmission characteristics of wireless channels can be subject to severe time-dependent variations, also referred to as fading, which necessitate channel estimation at the respective signal receiver or even at the signal transmitter itself to enable adequate and reliable signal transmission. This procedure causes additional effort and associated therewith obviously also significant energy consumption which has an essential influence on the network lifetime, especially in sensor networks having a large number of nodes.

A further disadvantage of the strict separation between function variable value transmission according to TDMA on the one hand and actual function result computation on the other hand is the extremely limited data rate with regard to function value computation. This means that with uniform quantization of each of the K measurement values with Q bits, the receiving nodes can calculate a function value of the reconstructed data every Q·K time slots at most, which is why especially for large networks where K is large and/or in the case of a fine resolution, i.e. Q is large, the waiting cycles are significant. When a specific protocol structure exists, such as IEEE Standard 802.15.4, even (Q+R)K time slots are necessitated, wherein R describes the number of bits induced by the overhead of the protocol in every time slot. Consequently, the receiving node can request a new function value only every (Q+R)K time slots, which is a very limiting factor, especially in time critical applications or alarm situations.

Information-theoretical analyses in B. Nazer and M. Gastpar, "Computation over multiple-access channels," IEEE Trans. Inf. Theory, Vol. 53, No. 10, P. 3498-3516, October 2007 have shown, however, that when strictly assuming perfect synchronization and perfect channel information at sensor nodes, the interference characteristic of multiple-access channels can explicitly be used for calculating linear functions. In particular, this reference suggests to simultaneously transmit digital function variable values bit by bit or digit by digit to the receiving node, and to thereby incorporate the characteristics of the multiple-access channel in the interesting computation of the linear combination of the function variable values. The inherent characteristic or the mathematical behavior of the multiple-access channel, which is used there, consists of forming a linear combination or summation of the simultaneously transmitted complex-valued transmitting symbols $R_{kq}(t)$, $k=1, \ldots, K$; $q=1, \ldots, Q$, which resulted from measurement data $X_k(t)$ by quantizing, i.e. $Q(X_k(t))=(R_{k1}(t), \ldots, R_{kQ}(t))$ for all k, wherein Q describes any abstract quantization operator. The output of the wireless multiple-access channel, when assuming perfect synchronization between sensor nodes, has the explicit form:

$$Y_q(t) = \sum_{k=1}^{K} H_{kq}(t) R_{kq}(t) + N_q(t), \quad (1)$$

$$q = 1, \ldots, Q,$$

wherein $H_{kq}(t)$ describes the complex channel influence (fading coefficient) between the kth sensor and the receiving node during transmission of the qth symbol and $N_q(t)$ designates complex additive receiver noise. Equation (1) specifies again mathematically the above-mentioned behavior of the multiple-access channel, namely formation of a linear combination (summation). Here, it should be noted that q represents a discrete time parameter not to be mistaken for the excitation time t.

Thus, the idea of Nazer and Gastpar uses the sum characteristic (1) for calculating linear functions under the condition of a certain correspondence between the behavior of the multiple-access channel (1) and the desired function $f(X_1(t) \ldots, X_K(t))$. Since in this context no steps have to be taken against the interference influence of the channel, in the ideal case and in contrast to the TDMA example described above, a new function value can be initiated from the access point every Q time slots.

However, the purely information-theoretical considerations of Nazer and Gastpar have a significant disadvantage, namely the assumption of perfect synchronization between sensor nodes, which can, especially in large networks, not be realized at all or only with unreasonably large effort. Thus, in M. Goldenbaum, S. Stanczak and M. Kaliszan, "On function computation via wireless sensor multiple-access channels," in Proc. IEEE Wireless Communications & Networking Conference (WCNC), Budapest, Hungary, April 2009 a method has been presented which can do completely without explicit protocol structure and additionally makes only coarse synchronization requests to the system. In contrast to Nazer and Gastpar, the idea of the latter article was to let every sensor node transmit a different sequence of complex values of the length $M \in \mathbb{N}$ with a transmit power that depends on the measured sensor data. Under certain conditions, the powers of the K sequences add up during transmission via the multiple-access channel, so that all the receiving node has to do is merely determine the receive power and to perform some simple arithmetic computations. For implementation, it is suggested to use, as the sequences of complex values whose transmit power is set according to the function variable value to be transmitted, unit norm sequences of random phases having a constant magnitude. Thus, synchronization is significantly less critical than for Nazer and Gastpar. However, this approach also assumes perfect knowledge of complex channel coefficients describing the channel influence between the respective sensor node and the receiving node. Thus, although the synchronization tasks are less critical than for Nazer and Gastpar, even according to the latter approach, there remains the high effort for perfect estimation of the complex channel influence between transmitters and receivers, and this influence shows in increased power costs for channel estimation as well as in a reduced function result rate.

SUMMARY

According to an embodiment, a function receiver for determining a function result of a plurality of function variable values from a plurality of function variable value transmitters may have: a receiver for receiving, in a channel estimation phase, a first multiple-access channel signal corresponding, due to a sum characteristic of a wireless multiple-access channel, to a summation of constant power signals from the plurality of function variable value transmitters at the receiver, wherein the constant power signals are first sequences of symbols, wherein, for the plurality of function variable value transmitters, a symbols' phase varies differently and randomly, pseudo-randomly or deterministically with uniform distribution, and a symbols' magnitude is the same for the function variable value transmitters and also for any function variable value transmitter for the respective symbols, and, in a normal operating phase, a second multiple-access channel signal corresponding, due to a sum characteristic of a wireless multiple-access channel, to a summation of a second plurality of sequences of symbols from the plurality of function variable value transmitters, wherein, for the plurality of function variable value transmitters, a symbols' phase varies differently and randomly, pseudo-randomly or deterministically with uniform distribution, and a symbols' magnitude is the same for the function variable value transmitters and depends on the respective function variable value of the respective function variable value transmitter, over the multiple-access channel at the receiver; a channel estimator for detecting a receive power of the first multiple-access channel signal during a time in which the first sequences of symbols overlap to acquire a second order statistical moment describing the multiple-access channel; and a function result determiner for determining the function result based on a receive power of the second multiple-access channel signal and the second order statistical moment.

Another embodiment may have a plurality of function variable value transmitters, wherein each function variable value transmitter is implemented to transmit a function variable value together with further function variable values of other function variable value transmitters over a multiple-access channel to a function receiver, wherein each function variable value transmitter is configured to transmit, in a channel estimation phase, in a temporally overlapping manner, a constant power signal, wherein the constant power signal is a first sequence of symbols, wherein, for the plurality of function variable value transmitters, a symbols' phase varies differently and randomly, pseudo-randomly or deterministically with uniform distribution, and a symbols' magnitude is the same for the function variable value transmitters and also for any function variable value transmitter for the respective symbols so that, due to a sum characteristic of the wireless multiple-access channel, a summation of the constant power signals results at a receiver of the function receiver and, in a normal operating phase, a second sequence of symbols, wherein a symbols' phase varies randomly temporally, pseudo-randomly temporally or deterministically, with uniform distribution, temporally, and a symbols' magnitude is the same for the symbols of a respective function variable transmitter and depends on the respective function variable value, without channel-dependent pre-distortion and such that a transmit power of the sequence of symbols depends on the respective function variable value, and in a temporally overlapping manner so that, due to a sum characteristic of the wireless multiple-access channel, a summation of the constant power signals results at the receiver of the function receiver.

Another embodiment may have a plurality of function variable value transmitters, wherein each function variable value transmitter is implemented to transmit a function variable value together with further function variable values of other function variable value transmitters over a multiple-access channel to a function receiver, and includes: a channel estimator for estimating a magnitude of a channel influence between the function variable value transmitter and the function receiver from a pilot signal transmitted by the function receiver; and a transmitter for transmitting a sequence of symbols, wherein a symbols' phase varies randomly temporally, pseudo-randomly temporally or deterministically, with uniform distribution temporally, and a symbols' magnitude is the same for the symbols of a respective function variable value transmitter and depends on the respective function variable value, by pre-distorting the symbols in dependence on an inverse of the magnitude of the channel influence, but independent of a phase of the channel influence, and such that a transmit power of the sequence of symbols depends on the function variable value, in a temporally overlapping manner so that, due to a sum characteristic of the wireless multiple-access channel, a summation of the second sequences of symbols results at a receiver of the function receiver.

According to another embodiment, a system may have: a plurality of inventive function variable value transmitters; and a function receiver for determining a function result of the plurality of function variable values from the plurality of function variable value transmitters, the function receiver including: a receiver for receiving a first multiple-access channel signal corresponding to a superposition of constant power signals of the plurality of function variable value transmitters over the multiple-access channel at the receiver, and a second multiple-access channel signal corresponding to a superposition of the plurality of sequences of symbols from the plurality of function variable value transmitters; a channel estimator for detecting a receive power of the first multiple-access channel signal during a time in which the first sequences of symbols overlap to acquire a second order statistical moment describing the multiple-access channel; and a function result determiner for determining the function result based on a receive power of the second multiple-access channel signal and the second order statistical moment.

According to another embodiment, a system may have: a plurality of inventive function variable value transmitters; and a function receiver for determining a function result of the plurality of function variable values from the plurality of function variable value transmitters, the function receiver having: a receiver for receiving a multiple-access channel signal corresponding to a summation of the plurality of sequences of symbols from the plurality of function variable value transmitters over the multiple-access channel at the receiver; and a function result determiner for determining the function result based on a receive power of the multiple-access channel signal; and a pilot transmitter for transmitting the pilot signal.

According to another embodiment, a method for determining a function result of a plurality of function variable values from a plurality of function variable value transmitters at a receiver may have the steps of: receiving, in a channel estimation phase, a first multiple-access channel signal corresponding, due to a sum characteristic of a multiple-access channel, to a summation of constant power signals from the plurality of function variable value transmitters over a multiple-access channel at the receiver, wherein the constant power signals are first sequences of symbols, wherein, for the plurality of function variable value transmitters, a symbols' phase varies differently and randomly, pseudo-randomly or deterministically with uniform distribution, and a symbols' magnitude is the same for the function variable value transmitters and also for any function variable value transmitter for the respective symbols, and, in a normal operating phase, a second multiple-access channel signal corresponding, due to a sum characteristic of a multiple-access channel, to a summation of a plurality of sequences of symbols from the plurality of function variable value transmitters wherein, for the plurality of function variable value transmitters, a symbols' phase varies differently and randomly, pseudo-randomly or deterministically with uniform distribution, and a symbols' magnitude is the same for the function variable value transmitters and depends on the respective function variable value of the respective function variable value transmitter, over the multiple-access channel at the receiver; detecting a receive power of the first multiple-access channel signal during a time in which the first sequences of symbols overlap to acquire a second order statistical moment determining a statistical quantity describing the multiple-access channel based on the first multiple-access channel signal; and determining the function result based on a receive power of the second multiple-access channel signal and the second order statistical moment.

According to another embodiment, a method for operating a plurality of function variable value transmitters, wherein each function variable value transmitter is implemented to transmit a function variable value together with further function variable values of other function variable value transmitters over a multiple-access channel to a function receiver may have the steps of: in a channel estimation phase, transmitting a constant power signal, in a temporally overlapping manner from every function variable value transmitter, so that the constant power signal is a first sequence of symbols, wherein, for the plurality of function variable value transmitters, a symbols' phase varies differently and randomly, pseudo-randomly or deterministically with uniform distribution, and a symbols' magnitude is the same for the function variable value transmitters and also for any function variable value transmitter for the respective symbols so that, due to a sum characteristic of the wireless multiple-access channel, a summation of the constant power signals results at a receiver of the function receiver; and in a normal operating phase, transmitting a second sequence of symbols wherein a symbols' phase varies randomly temporally, pseudo-randomly temporally or deterministically, with uniform distribution, temporally, and a symbols' magnitude is the same for the symbols of a respective function variable value transmitter and depends on the respective function variable value, without channel-dependent pre-distortion, and such that a transmit power of the sequence of symbols depends on the function variable value, and in a temporally overlapping manner so that, due to a sum characteristic of the wireless multiple-access channel, a summation of the constant power signals results at the receiver of the function receiver.

According to another embodiment, a method for operating a plurality of function variable value transmitters, wherein each function variable value transmitter is implemented to transmit a function variable value together with further function variable values of other function variable value transmitters over a multiple-access channel to a function receiver, may have the steps of: estimating a magnitude of a channel influence between the function variable value transmitter and the function receiver from a pilot signal transmitted by the function receiver; and transmitting a sequence of symbols, wherein a symbols' phase varies randomly temporally, pseudo-randomly temporally or deterministically, with uniform distribution temporally, and a symbols' magnitude is the same for the symbols of a respective function variable value transmitter and depends on the respective function variable value, by pre-distorting the symbols in dependence on an inverse of the magnitude of the channel influence, but independent of a phase of the channel influence, and such that a transmit power of the sequence of symbols depends on the function variable value, and in a temporally overlapping manner so that, due to a sum characteristic of the wireless multiple-access channel, a summation of the constant power signals results at a receiver of the function receiver.

Another embodiment may have a computer program having a program code for performing the inventive methods, when the program runs on a computer.

On the one hand, it is the finding of the present invention that it is possible to limit a transmitter-side estimation of the complex channel influence between function variable value transmitters on the one side and function receivers on the other side to the estimation of the magnitude of the channel influence, such that pre-distortion of the symbols of the symbol sequences does depend on an inverse of the magnitude of the channel influence, but is independent of a phase of the channel influence, and in particular in that this easing of channel estimation does not change anything in the central tendency of the function results transmitted and calculated via the multiple channel. In other words, it is a finding of the present invention that easing the channel estimation does not result in a corruption of the function result.

According to a further aspect of the present application, it is a finding that it is possible to omit pre-distortion on the side of the function variable transmitters and instead determine a statistical quantity on the side of the function receiver describing the multiple-access channel. For this, it is sufficient when the function variable value transmitters transmit, in a channel estimation phase, constant power signals via the multiple-access channel. Thus, the channel estimation effort is transferred to the function receiver and hence occurs less frequently, which again reduces the overall energy expenditure. In particular, the same is reduced on the function variable value transmitter side, which particularly advantageous in applications where the same are autonomous or battery operated.

According to embodiments of the present invention, the function receiver does not have only one but a plurality of antennas, wherein the function result is obtained based on a sum of receive powers of the second multiple-access channel at the several antennas. It can be seen that in many fields of application, this procedure results in a better ratio between accuracy of the obtained function result on the one hand and the length of the sequences of symbols and hence the necessitated energy per function result, or the obtainable function result repeat rate, can be improved for example so much that also the above implementation with receiver-side channel estimation based on a superposition of constant power signals or power signals from the function variable value transmitters is suitable for applications necessitating high accuracy.

BRIEF DESCRIPTION OF THE DRAWINGS

Embodiments of the present invention will be detailed subsequently referring to the appended drawings, in which:

FIGS. 4b and c are block diagrams for different embodiments of a function receiver of the system of FIG. 4a;

FIGS. 5b and c are block diagrams for different embodiments of a function receiver of the system of FIG. 5a;

FIG. 6 is graphs for illustrating the usage of several antennas for the case of function receiver-side estimation of the channel influence across statistical quantities according to the embodiment of FIG. 5a-c;

FIG. 7 is further graphs for illustrating the result shown in FIG. 6 for a higher number of function variable value transmitters and a higher number of symbols per symbol sequence.

DETAILED DESCRIPTION OF THE INVENTION

Figure 1:
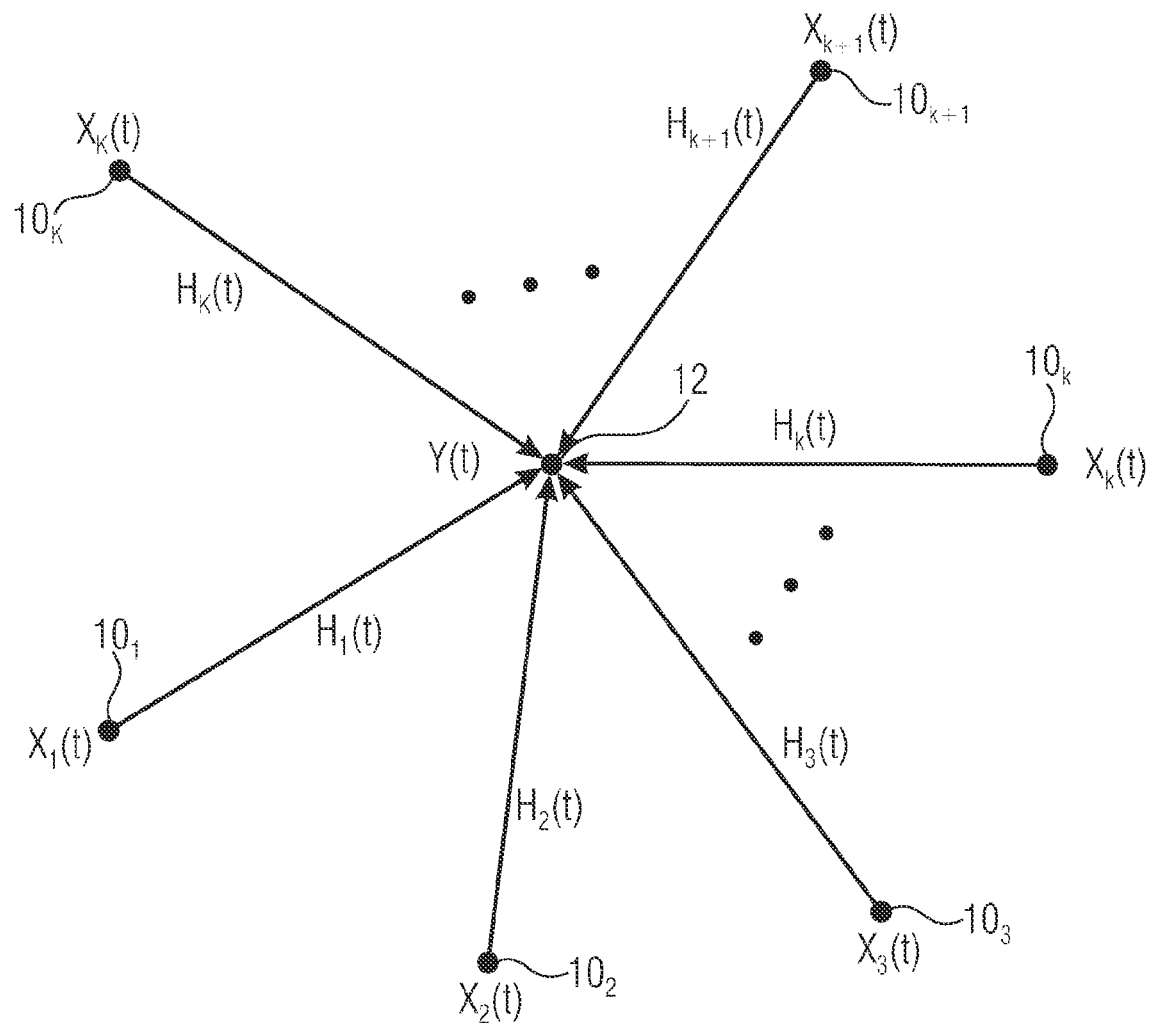
FIG. 1 is a schematic illustration of a system of function variable value transmitters and function receiver according to an embodiment.

Before the specific details of embodiments of the present invention will be discussed below, in the following the basic structure of a system in which the subsequently described embodiments can be used will be described. FIG. 1 shows such a system with a plurality of function variable value transmitters $10_1$-$10_K$ and a function receiver 12. It is the object of the system to provide a function result at the function receiver 12, which depends, according to a predefined and desired function $f$, on a plurality of function variable values that are transmitted by the function variable value transmitters $10_1$-$10_K$ in a temporally overlapping manner, which will be discussed in more detail below. The summing characteristic of the multiple-access channel between function variable value transmitters $10_1$-$10_K$ on the one side and function receiver 12 on the other side is used as part of the function result computation. The influence of the possibly temporally changing channel influence of the multiple-access channel on the transmit signals from the function variable value transmitters $10_1$-$10_K$ to the function receiver 12 are defined in FIG. 1 by $H_1(t)$-$H_K(t)$ for the K individual distances and is complex-valued in that it influences both phase and magnitude of the individual transmit signals. In a first approximation, the channel influence $H_1 \ldots {}_K(t)$ can be estimated with a complex-valued number for the individual distances between a respective function variable value transmitter and the function receiver 12.

The system of FIG. 1 can be, for example, a sensor network, which in other words can mean that the function variable values provided by the function variable value transmitters $10_1$-$10_K$ as function variables for calculating the function results can be sensor values, such as temperature values, pressure values, humidity values, acceleration values, etc. However, the present invention is not limited to sensor networks and hence the function variable values can also be different data, for example simulated data or data provided otherwise. In the following, in a simplified manner, it is sometimes assumed that it is a sensor network, wherein these passages are then obviously not to be interpreted in a limiting manner, but merely serve for easier understanding. The function variable values to be transmitted and to be used for calculating the function result are indicated in FIG. 1 by $X_1(t)$-$X_K(t)$, while the function result itself is indicated by $Y(t)$, wherein the time parameter t expresses that both the function variable values and the channel influence can be temporally varying quantities.

Figure 2:
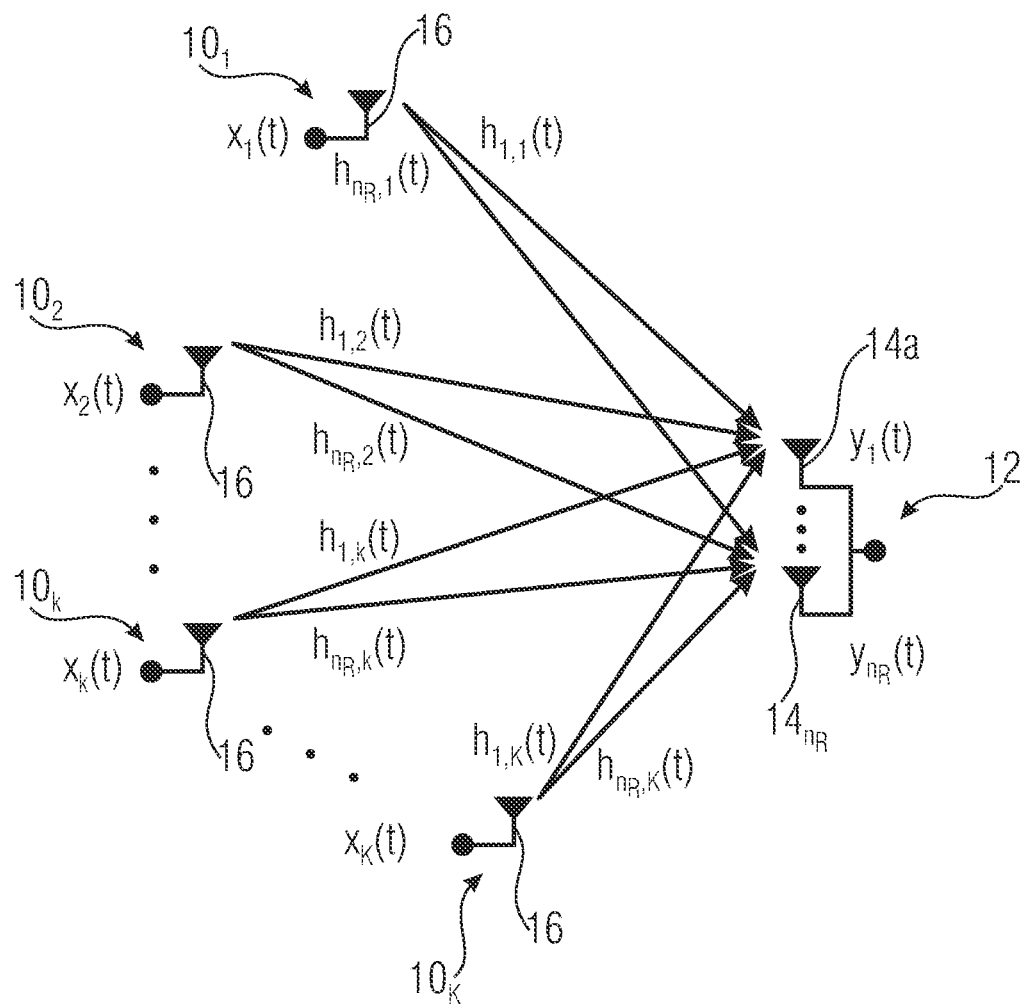
FIG. 2 is a schematic illustration of an embodiment for a system of function variable value transmitters and function receiver according to an embodiment, wherein the function receiver has several antennas.

FIG. 2 shows an embodiment of a system according to FIG. 1 for the case that the function receiver 12 comprises a plurality of antennas $14a$-$14n_R$, whereas here the function variable transmitters each comprise exemplarily only one antenna 16. As will be discussed in more detail below, the portions received at the several antennas $14a$-$14n_R$ will be converted separately into receive powers, such as, for example, in integrated form, as receiving energies, which are again summed to obtain the function result based on the sum. Processing the receive power sum will be discussed in more detail below, but provides, for example, according to an embodiment described below with reference to FIG. 5a-c, broadly speaking, receiving-side correction of the channel influence by means of a statistical value, which is to describe the channel influence and is obtained based on constant power signals transmitted by the function transmitters in a time overlapping manner, correction of the receiver noise by subtraction as well as post-processing for adapting the multiple-access channel function characteristics to the desired function. In FIG. 2, some quantities indicated in FIG. 1 by capital letters are indicated by lower case letters, such as the function variable values to be transmitted and underlying the function result, by $x_1 \ldots {}_K(t)$ and the complex channel influence by $h_{1 \ldots n_R, 1 \ldots K}(t)$ for the respective $n_R \cdot K$ distances between the antennas 16 of the function variable value transmitters $10_1$ on the one side and the $n_R$ antennas of the function receiver 12 on the other side, and $y_{1 \ldots n_R}(t)$ indicates the individual receiving portions at the individual antennas $14a$-$14n_R$.

In the following, without limiting the generality, the case is considered that the function receiver 12 comprises $n_R$ antennas. However, this is merely in view of the fact that considering this case also covers the case that the function receiver 12 comprises merely one antenna, i.e. $n_R=1$. Here, it is advantageous when the function receiver 12 comprises merely one antenna, when the pre-distortion is performed on the function transmitter side, since then channel estimation phases have to be sacrificed merely for this one antenna, and also only a normal operating phase with pre-distortion is necessitated for the one receiving antenna at the transmitters and, vice versa, in the case of the receiving side channel estimation and correction as discussed below, the provision of several antennas is advantageous for increasing the quality of the function result. Thus, regarding the antenna number, the following embodiments are not to be seen in a limiting sense. Details regarding the internal structure and the mode of operation of the function variable value transmitters $10_1$-$10_K$ on the hand and the function receiver 12 on the other hand, as well as their cooperation, will only be discussed later on below. First, an attempt is made to motivate and describe the main aspects of the individual embodiments consisting of the fact that in first embodiments, the function variable value transmitter side channel estimations are limited to the magnitude of the channel influence, while the phase of the channel influence is not considered in the pre-distortion, and in second embodiments, the channel estimation is performed on the function receiver side, based on constant power signals that are transmitted by the function variable value transmitters in a time overlapping manner via the multiple-access channel, and used, by applying predetermined assumptions on the function receiver side, to determine a statistical quantity describing the multiple-access channel.

Figure 3:
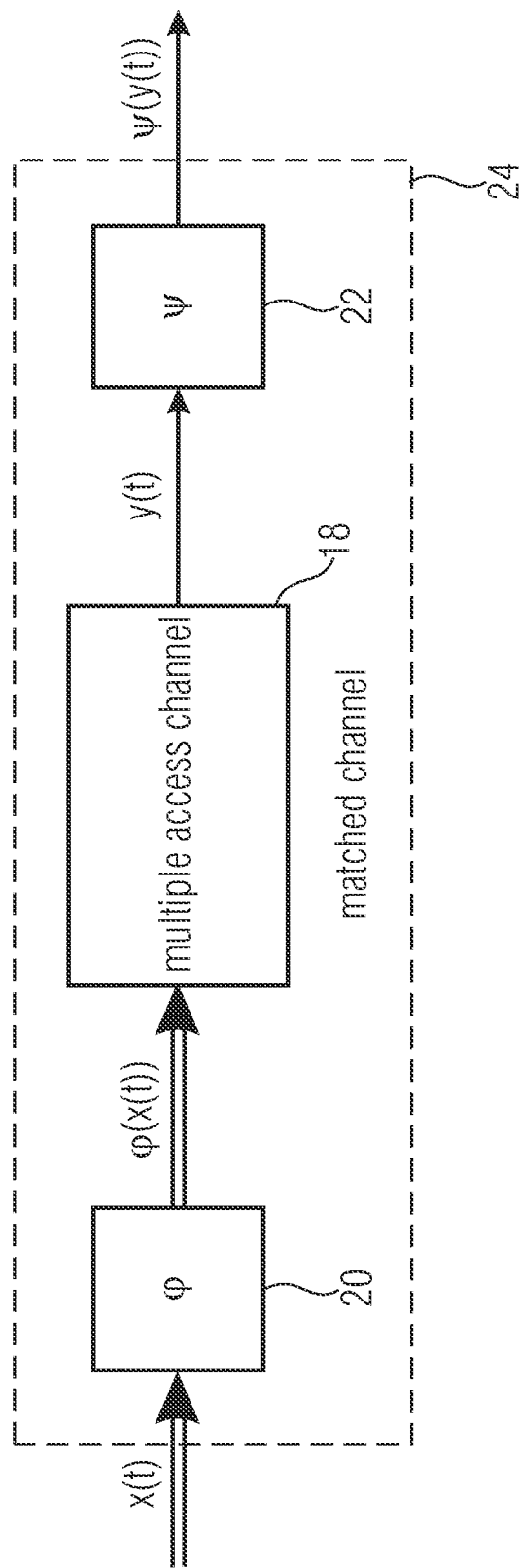
FIG. 3 is a block diagram for illustrating the usage of a multiple-access channel for function variable value transmission and function computation according to an embodiment.

The approach underlying the embodiments described below consists, first of all, in mapping the sensor data $x_1 \ldots {}_K(t)$ to a real-valued transmit power or in using them as real-valued transmit power by which the individual transmitting nodes $10_1$-$10_K$ transmit randomly generated complex-valued sequences $s_k(t)=(S_{k1}(t), \ldots, S_{kM}(t))^T$ of the length M. The complex elements or symbols $S_{km}(t)$, $k=1, \ldots, K$; $m=1, \ldots, M$ have, for example, the magnitude $1/\sqrt{M}$ and can have, for example, an uniformly distributed phase in the interval $[0, 2\pi)$, which can, for example, be statistically independent for all k and m. The latter measure does not effect orthogonality between the individual symbol sequences of the individual function variable value transmitters $10_1$-$10_K$, but effects decorrelation between function variable values $x_1 \ldots {}_K(t)$ on the one hand and superposition of the same via the multiple-access channel on the receiver 12 on the other hand. This has the advantage that no precise symbol and phase synchronization of the sensor nodes $10_1$-$10_K$ to one another and relative to the receiving node 12 is necessitated to ensure constructive superposition of the transmit signals at the receiving node 12, but a coarse block synchronization has to be ensured merely in large time intervals, which is sufficient for the symbol sequences of the transmitters $10_1$-$10_K$ to overlap for a sufficient time during which the receiving node 12 determines the receive power, which makes the embodiments described below very robust against synchronization errors. For extending the magnitude of functions that can be calculated with the help of the wireless multiple-access channel, at the individual transmitting nodes $10_1$-$10_K$, adequate pre-processing functions $\phi_k$ can be used, which have an effect on the measurement data $X_k(t)$, i.e. $\phi_k(X_k(t))$, wherein vice versa the receiving node 12 can use an allocated post-processing function $\psi$, which is applied to the output of the multiple-access channel, i.e. $\psi(Y_n(t))$, $n=1, \ldots, n_R$. Here, as stated, in the case of more than one receiving antenna $14a$-$14n_R$, the output of the multiple-access channel corresponds, to the receive signal at every individual antenna $14a$-$14n_R$. These pre- and post-processing functions can be selected, depending on the desired function $f$, such that they all in all match the multiple-access channel to the desired function $f$, or perform a respective transform. Qualitatively, this context is illustrated in FIG. 3. The function variable or sensor values $x(t)$ are mapped by the pre-processing function 20, namely $\phi$, to $\phi(x(t))$, before the same are transmitted as transmit power via the multiple-access channel 18, wherein the resulting multiple-access channel signal $y(t)$ is supplied to the post-processing function 22, namely $\psi$, at the receiver 14, which leads to the desired result, i.e. $\psi(y(t))$ equal to $f$ applied to $x(t)$ of all function variable value transmitters. The transformations 20, 18 and 22 connected in series are referred to as matched channel 24. It should be noted that by transformations 20 and 22 also a plurality of nonlinear functions $f$ can be calculated. Thus, FIG. 3 illustrates that it is possible to match the natural mathematical channel characteristic of the multiple-access channel 18 to the mathematical characteristic of the desired function $f$ by pre- and post-processing functions $\phi$ and $\psi$.

Since transmit powers are strictly positive, embodiments provide for the fact that the respective transmit power of the node k, i.e. $\phi_k$ is higher than or equal to 0 for all excitation times t and especially for all possible measurement values $X_k$, k=1..., K, by an additional, for example bijective or uniquely reversible function g, which is applied in the sequence of FIG. 3 prior to φ to x(t). For ensuring this, the function g should be selected such that it transforms the measurement values $X_k$ prior to pre-processing with $\phi_k$, i.e. $g(X_k(t))=R_k(t)$, that the boundary condition $\phi_k(R_k(t))>0$ is fulfilled. Further, a constant α>0 can be introduced into the signal processing chain according to FIG. 3, for example between blocks 20 and 18, such that by means of this multiplicative constant the compliance with strict transmit power constraints at the sensor nodes is provided, i.e. the compliance with $\alpha \cdot \phi_k(R_k(t)) \leq P_{max}$. In other words, when, for example, the sensor nodes $10_1$-$10_K$ are limited by a maximum transmit power $P_{max}$, α can be selected such that basically $0<\alpha\phi_k(g(X_k(t)))\leq P$ applies. The above-described measures are reversed on the receiving side. For the case of using the factor α at the function variable value transmitters, this value α should be known at the receiving node 12. Additionally, a should be independent of k or the same for all function variable transmitters $10_1$-$10_K$. In that way, the function receiver can reverse the influence of α on the function result value. The same applies to the above-described measure for adapting the definition range of the function variable values at the definition range of the multiple-access channel 18—only positive transmit powers. The function receiver 12 applies the reverse function $g^{-1}$ to the output result of the transformation 22, i.e. ψ, which leads to the desired result, i.e. the function result value of the function f applied to the function variable values $X_k$.

The above complete signal processing chain described subsequent to the discussion of FIG. 3 will be used in the embodiments of FIGS. 4a-c and 5a-c described below. In specific cases of application with specific desired functions and specific range of values for the variables, the signal processing chain can be limited to transmission via the multiple-access channel.

In other words, FIG. 3 shows a possible complete signal processing chain for the system of FIG. 1 or 2 for the case that the channel influence of the multiple-access channel on the individual channels between the individual transmitting nodes $10_1$-$10_K$ on the one side and the receiving node 12 on the other side is of no importance. Again, in other words, FIG. 3 assumed that the multiple-access channel 18 merely comprises the sum characteristic to be used but does not influence the individual signals of the function variable value transmitters $10_1$-$10_K$ beyond that. This assumption would be justified if this channel influence were completely known or for the case of perfect complex channel knowledge. This perfect complex channel knowledge could, for example, be used at the sensor nodes $10_1$-$10_K$ to pre-distort or multiply the transmit signals passing the multiple-access channel 18 by the inverse of the complex channel influence, whereby the influence of the multiple-access channel 18 would be limited to summation. However, as described in the introductory part of the description of the present application, the estimation of a complex channel influence including magnitude and phase is an expensive matter, and thus, simplifying the channel estimation is of enormous significance. The embodiments of FIGS. 4a.c and 5a-c achieve this objective.

Figure 4A:
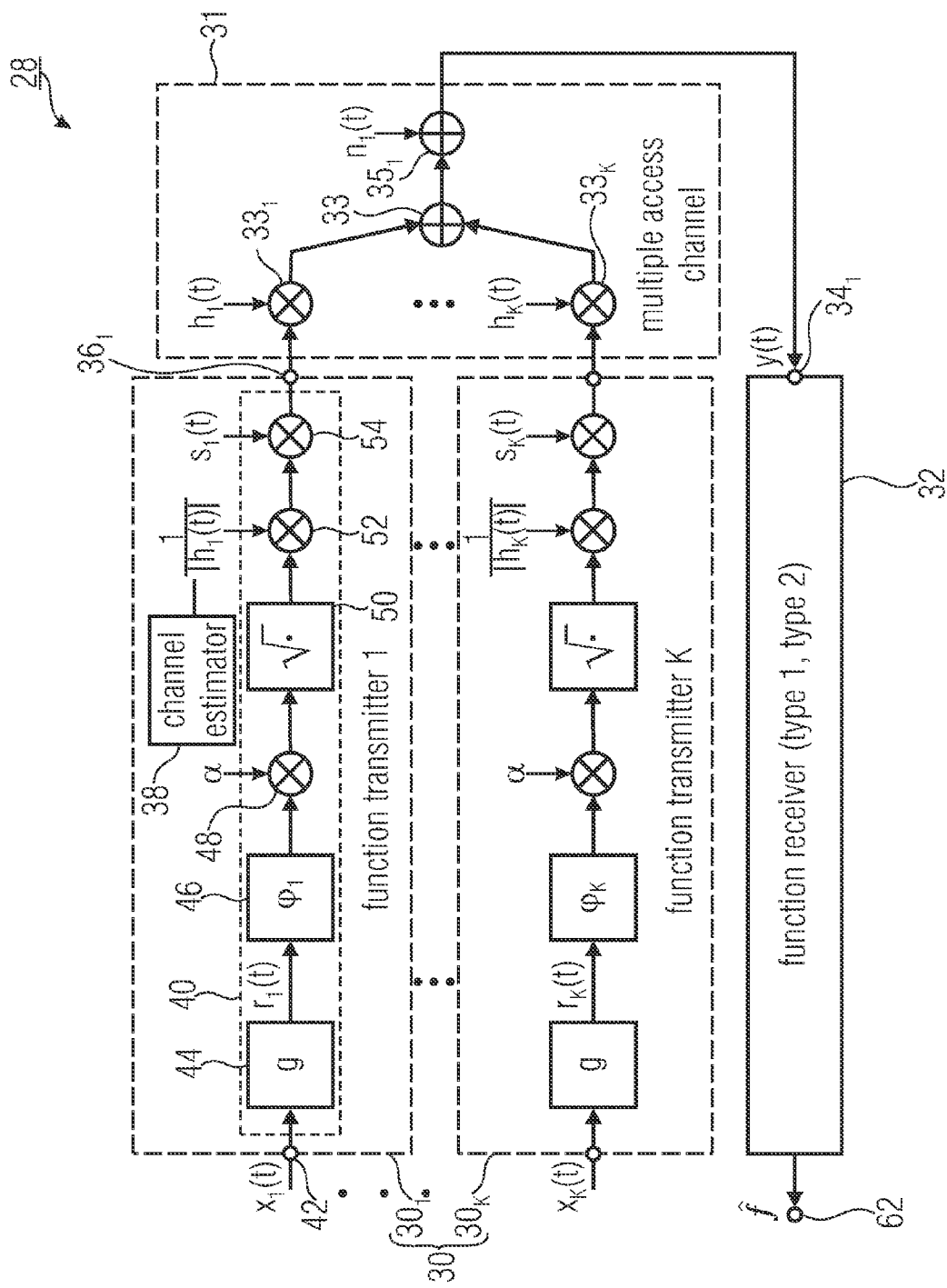
FIG. 4a is a block diagram of a system of function variable value transmitters and function receiver according to a detailed embodiment.
Figure 4B:
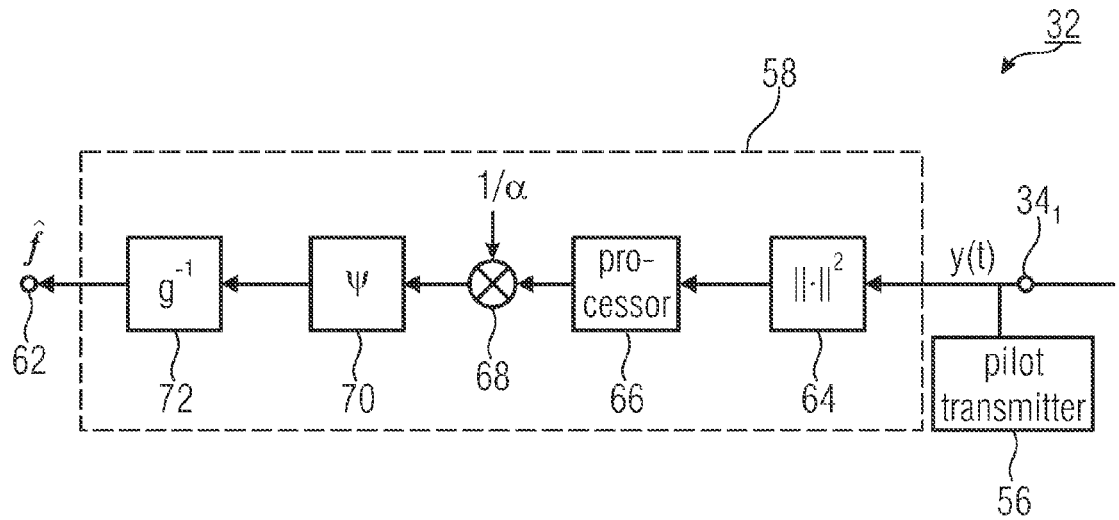
Figure 4C:
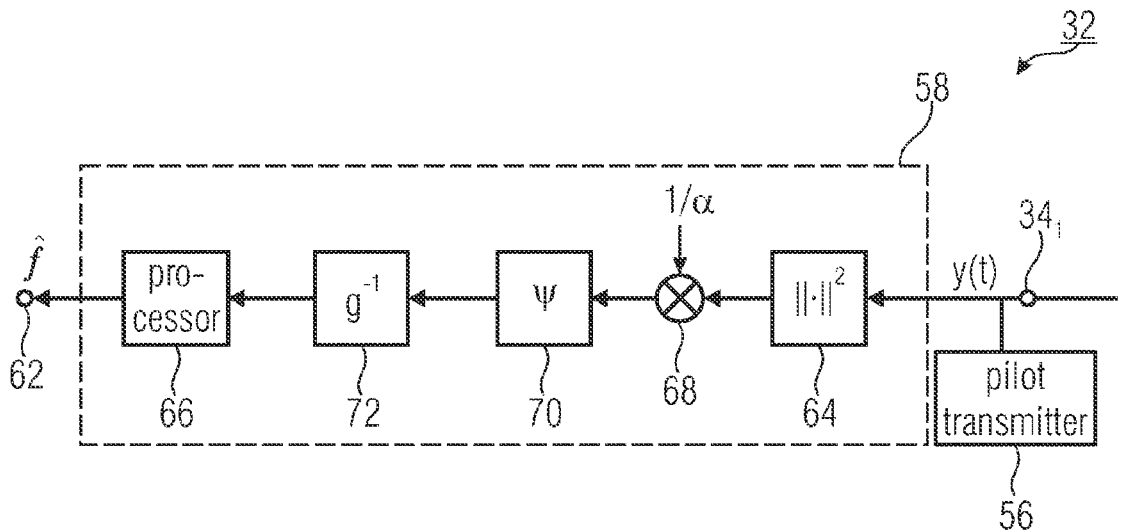
Figure 5A:
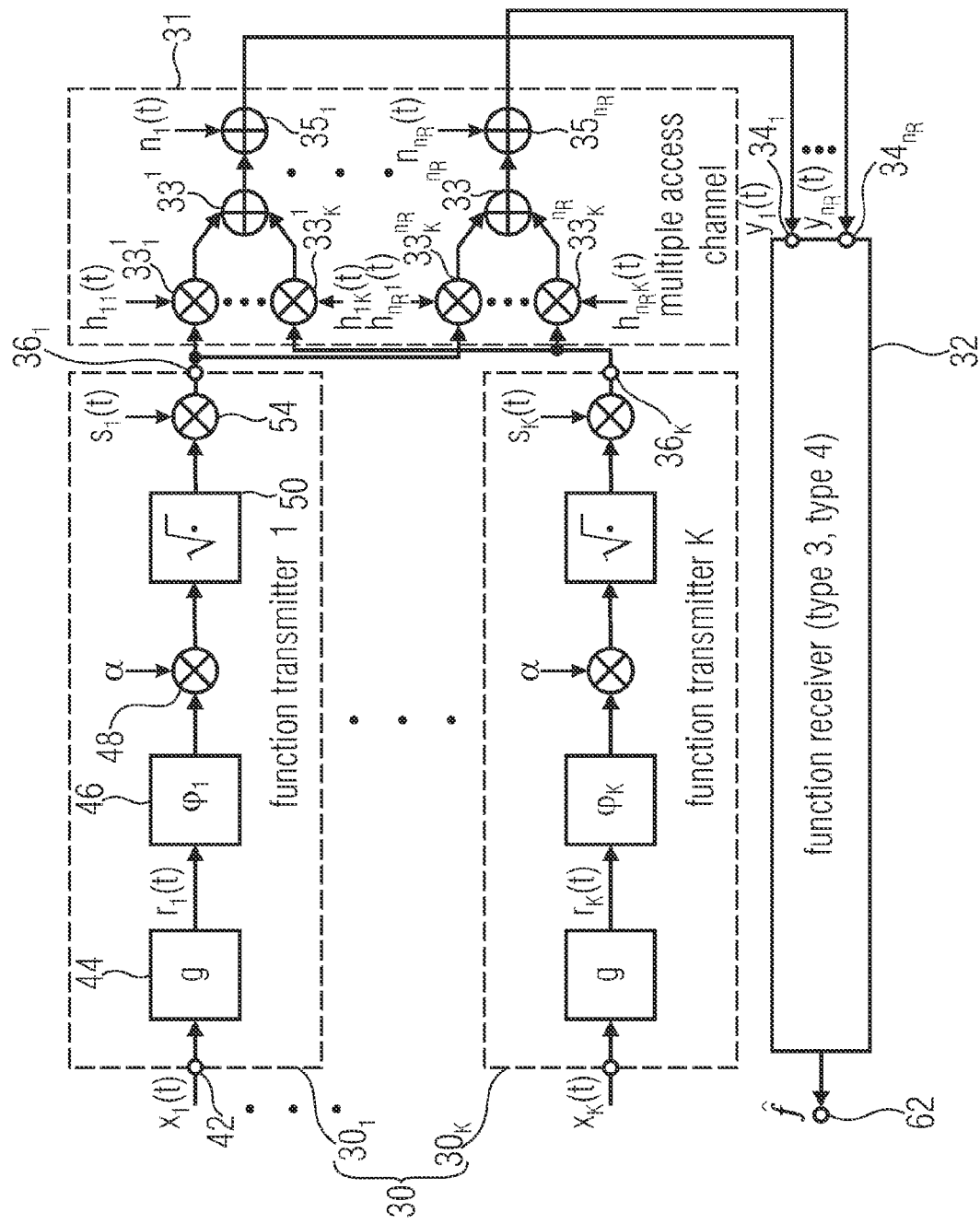
FIG. 5a is a block diagram of a system of function variable value transmitters and function receiver according to a further detailed embodiment.
Figure 5B:
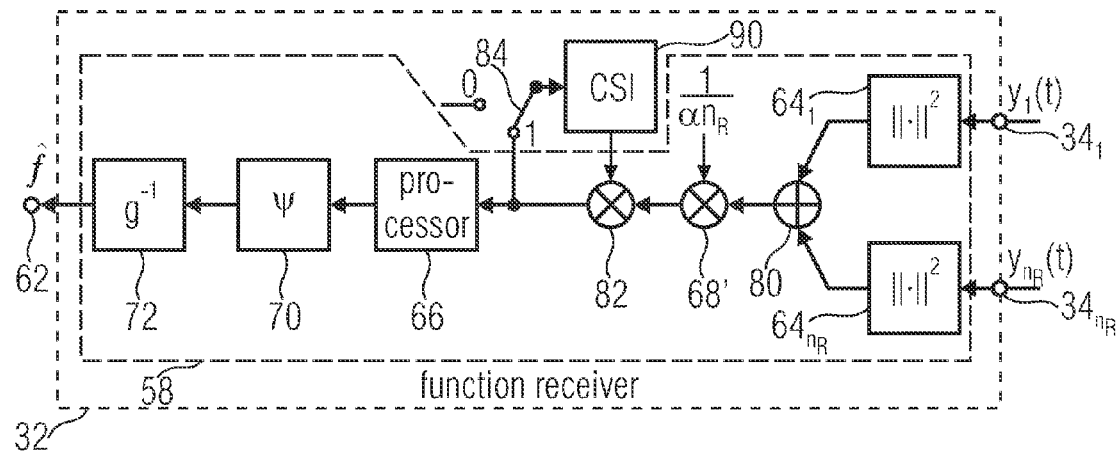
Figure 5C:
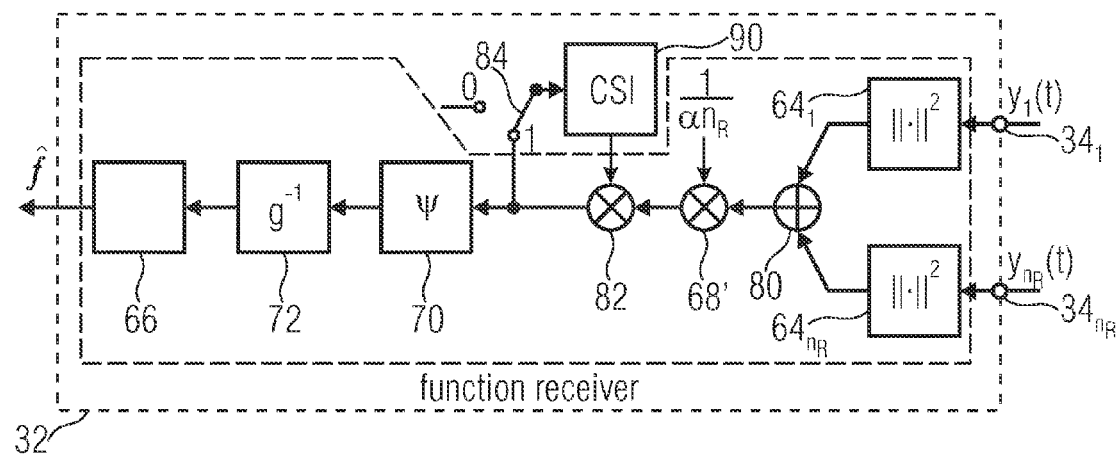
Figures 8A, 8B:
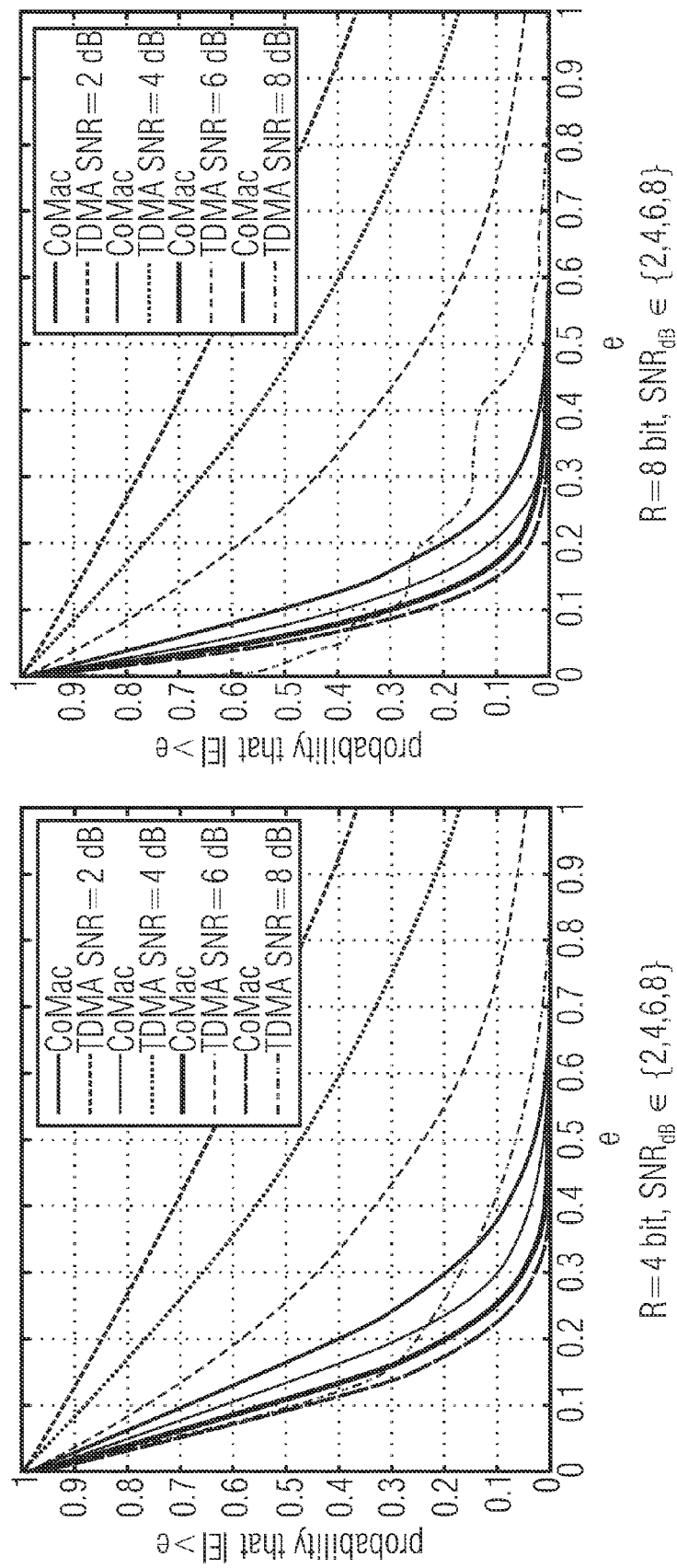
FIG. 8a-f is graphs for illustrating a power comparison between the case of the simplified estimation of the channel influence according to the embodiment of FIG. 4a-c with the case of a separate function variable value transmission by means of TDMA and subsequent function computation.
Figures 8C, 8D:
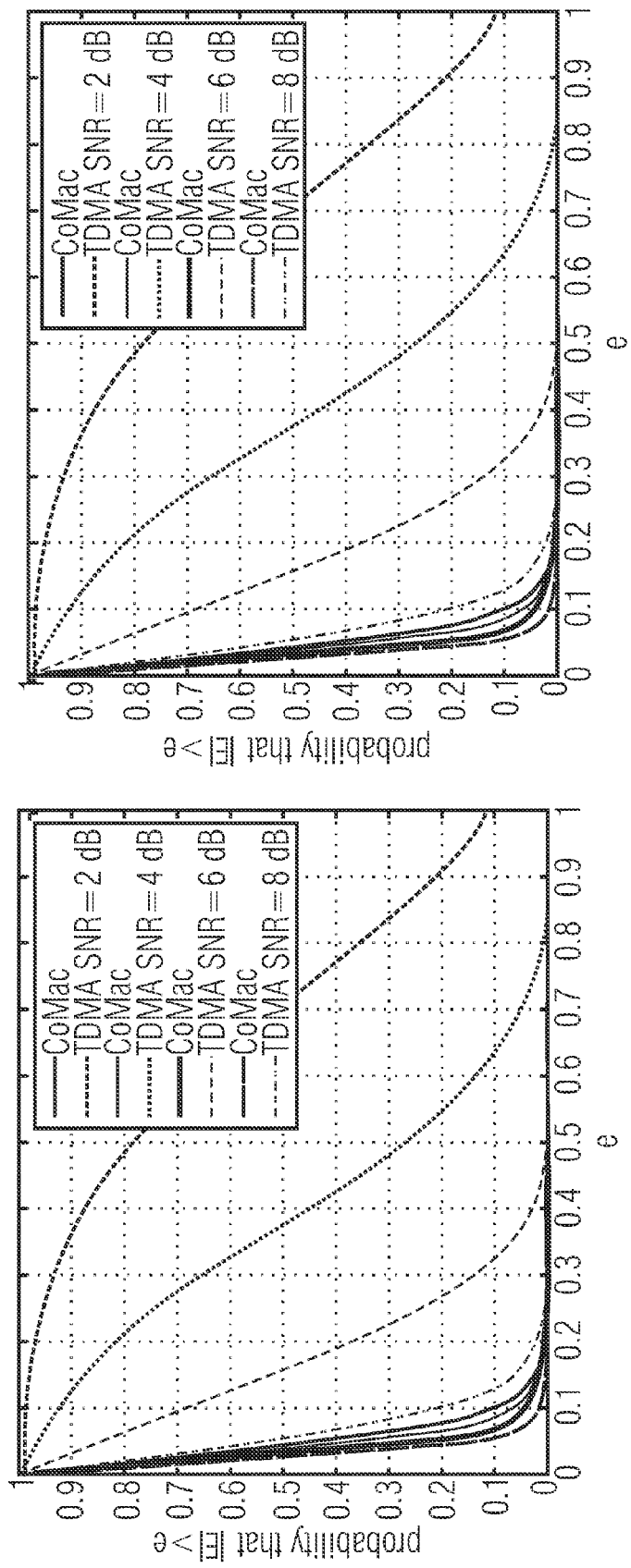
Figure 8F:
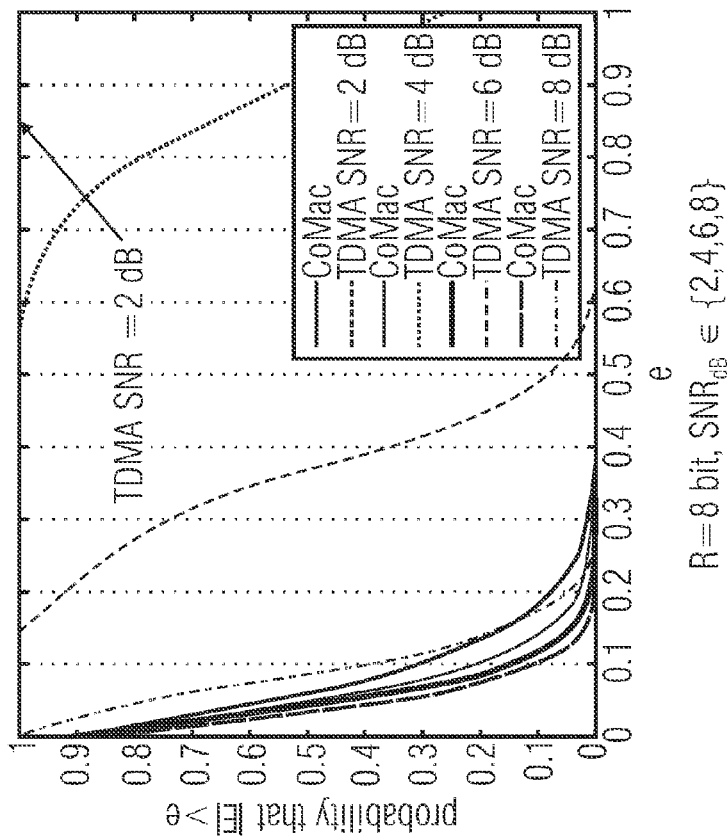
Figure 8E:
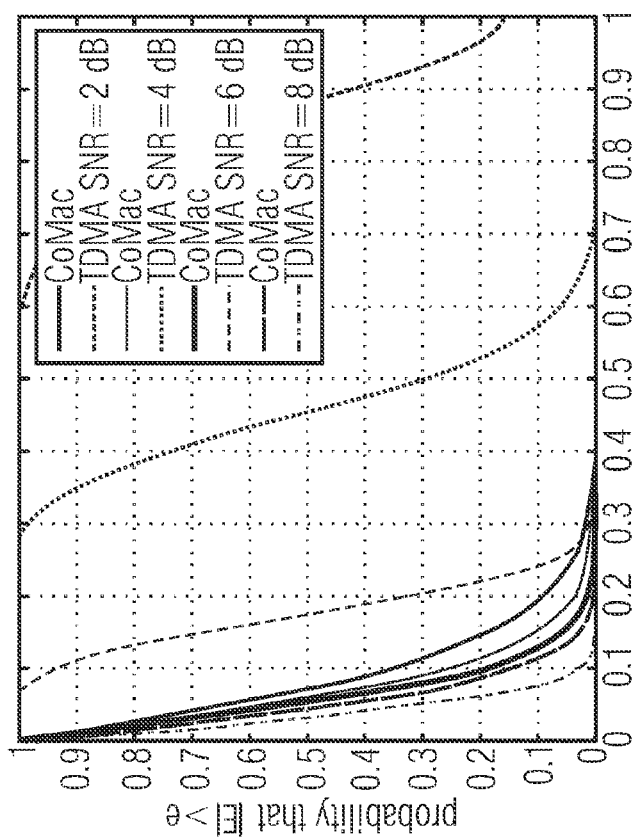

Both embodiments, i.e. the one of FIG. 4a-c as well as the one of FIG. 5a-c, are able to explicitly use the wireless multiple-access channel for calculating desired functions. The influence of the channel does not remain unconsidered, however, according to these embodiments, no perfect complex-valued channel information is necessitated, neither at the sensor nodes nor at the receiving node.

According to the embodiment of FIG. 4a-c, the fact is used that the sum characteristic of the channel is not only advantageous for function computation but also has an advantageous effect on measures against fading effects. It turns out and will be mathematically derived below that due to the fact that the measurement value information or the variable values are encoded as transmit power, the sensor nodes do not have to estimate the complete complex-valued channel influence, such as the complete complex channel coefficient, for pre-distortion, which would again necessitate a sensitive and very expensive phase estimation, but merely the magnitude $|h_k(t)|$ of the channel influence or coefficient between the k-th node and the receiving antenna for inverting, by the same, the channel prior to transmission. This is again independent of the respective statistic of the channels. In the specific application or the specific embodiment which will be described with reference to FIG. 4a-c, this means that the receiving node can initiate a function value transmission based on a known pilot sequence, which the sensor nodes use at the same time for adequately estimating the magnitudes of the respective channel influence or the magnitudes of the channel coefficients between the individual distances. Subsequently, every transmitter inverts the transmission channel during transmission not only with the complex coefficient $1/h_k(t)$, but merely with $1/|h_k(t)|$, which again drastically reduces effort, complexity and energy requirements for channel estimation. The combined residual error caused by squaring in the function receiver which will be discussed in more detail below and which is, broadly speaking, used for estimating the receive power on the receiving side, continues to be without averages despite simplifying the channel estimation. This means that despite this simplification, the residual error still has an average of 0, so that no loss is suffered with regard to the estimation power.

Since the receiving node is interested in the function f and not in the reconstruction of the individual measurement values, the same has, at the output of the multiple-access channel, merely access to a noisy linear combination of the transmit signals into which the measurement values are encoded as transmit power. Thus, it would actually be impossible to correct the fading influences of the channel on the receiving side, at the receiver 12 in the context of function computation, and correspondingly, in the embodiment of FIG. 4a-c, as mentioned above, the channel is also inverted prior to transmitting a symbol or a transmit signal from every transmitting node. However, according to the embodiment of FIG. 5a-c, the channel estimation effort is reduced further. For this, the specific sum structure of the wireless multiple-access channel and the long term statistic of the channel coefficients is considered. It turns out and will also be mathematically derived below that with a rising number of antennas $n_R$, rising number of nodes or number of transmitting nodes K as well as a specific assumption an the statistic distribution of the fading coefficients over time, channel estimation at sensor nodes can even be completely omitted. Instead, according to the embodiments of FIG. 5a-c, a very easily realizable correction of the cannel influence is performed on the receiving side or at the receiver 12 by determining, for correcting the channel influence, a statistical quantity of constant power signals of the transmitting nodes transmitted in an overlapping manner. For example, according to the embodiment of FIG. 5a-c, after squaring ($\|.\|^2$), division by off $\sigma_H^2|\mu_H|^2$ is performed. In such fading environments, the channel estimation effort is reduced to the simple task of determining a corresponding statistic quantity, such as merely the second order moment, i.e. $\sigma_H^2+|\mu_H|^2$. In fading scenarios where $\sigma_H^2+|\mu_H|^2=1$ holds true, channel estimation might even be completely omitted.

After the basic mode of operation of embodiments of the present invention has been outlined above, detailed embodiments for a system of function variable transmitters and function receiver will be described with reference to FIGS. 4*a-c* and 5*a-c*. Here, FIG. 4*a-c* shows an embodiment for a system with transmitter-side channel estimation and pre-distortion of the transmit signals, while FIG. 5*a-c* provides further simplification of the channel estimation effort in that the channel estimation—if necessitated at all—is transferred to the receiving side, where one or several statistic quantities, which describe the channel influence, are determined from a superposition of constant power signals from the function variable value transmitters.

It should be noted that in the embodiment of FIG. 4*a-c* the receiver merely comprises one antenna, such that merely one pilot signal is necessitated for the function transmitters being able to estimate, based on the same, the channel on the transmitter side, as will be described in more detail, and such that in the common temporally overlapping transmission by the function transmitters all can pre-distort specifically to the same single receiving antenna. Obviously, a procedure would be possible according to which pilot signals can be transmitted from individual antennas of the function receiver in a time sequential manner and the superimposed transmission is repeated $n_R$ times—each time with a different pre-distortion at the transmitters, which is individual for each receiving antenna—but the organizational effort would be far higher. Related to the nomenclature of FIG. 2, this means that in the embodiment of FIG. 4, merely channel influences $h_{1,1\ldots K} = h_{1\ldots K}$ are to be considered.

Thus, FIG. 4*a-c* shows a system 28 having a plurality 30 of function variable value transmitters or function transmitters $30_1$-$30_K$, each connected in a wireless communicative manner to a function receiver 32 of the system 28 via a common multiple-access channel 31. The multiple-access channel 31 is a wireless multiple-access channel, such as a radio channel, and has, as described above, a sum characteristic indicated by reference number 33 in FIG. 4. More accurately, the multiple-access channel 31 has the characteristic to influence simultaneously transmitted transmit signals from the function transmitters $30_1$-$30_K$ individually according to a complex channel influence $h_1(t) \ldots$, or $h_K(t)$ (cf. 33*a*-33K) and then to sum the same on the receiving side at the receiving antenna $34_k$, wherein as indicated in FIG. 4 by reference number $35_1$, a receiver noise $n_f(t)$ is added upon reception. Again in other words, the multiple-access channel 31 influences signals simultaneously transmitted at the antenna $36_1$-$36_K$ on their way to the receiving antenna $34_1$, by receiving, at the antenna, a sum of the receiver noise $n_f(t)$ on the one hand and the sum 33 of the transmit signals of the respective function receiver $30_k$ multiplicatively influenced by the respective complex channel influence $h_k(t)$ on the other hand.

Internally, every function transmitter $30_1$-$30_K$ has the same structure, which is why, in the following, the description and the reference numbers will be limited to the function transmitter $30_k$, but obviously apply analogously to the other function transmitters. The function transmitter $30_1$ includes a channel estimator 38 for estimating a magnitude of the complex channel influence $h_{nl}(t)$ between function transmitter $30_1$ and function receiver 32. Further, the function transmitter $30_1$ includes a transmitter 40 for transmitting a sequence of symbols, wherein a symbols' phase varies randomly temporally, pseudo-randomly temporally or deterministically, with uniform distribution, temporally, and a symbols' magnitude is the same for the symbols in dependence on the function value $x_f(t)$ to be transmitted and contributing to the function result, by pre-distorting the symbols depending on the inverse of the magnitude of the channel influence, but independent of a phase of the channel influence.

Apart from the antenna $36_1$, i.e. the interface to the multiple-access channel 31, the transmitter 40 includes an input 42 for the function value $x_1(t)$ to be transmitted and to be used as the function variable for the function result. In between, the transmitter 410 includes internally, connected in series, in the order stated below, a definition range adapter 44, a pre-processing transformer 46, a transmit power adjuster 48 for ensuring the compliance with maximum power specifications for the transmitter 40, a root extractor 50, a pre-distorter 52 and a symbol sequence generator 54 for generating the above described symbol sequences by using the output signal of the pre-distorter 52 as amplitude for the symbol sequences.

On the other hand, according to the embodiment of FIG. 4*b*, the function receiver 32 includes, in connection with the antenna $34_k$, a pilot transmitter 56 as well as function result determiner 58. The function result determiner 58 is connected between the antenna $34_1$ acting as interface to the multiple-access channel 31, and an output 62 of the function receiver 32 where the function result $f$ is output. Internally, the function result determiner 58 includes a series connection of a power estimator 64, a processor 66, the function of which will be discussed in more detail below, a receive power level adjuster 68, a post-processing transformer 70 and a definition range readapter 72, which are connected in series in the stated order between interface $34_1$ on the one side and output 62 on the other side.

After the structure of the system 28 has been described above, the exact mode of operation of the individual blocks and their cooperation will be discussed below. As already frequently mentioned above, the function transmitters $30_1$-$30_K$ encode their respective function values $x_1$-$x_K$ as transmit power. For this, the symbol sequence generators 54 generate sequences of complex symbols, wherein the symbols' phase varies randomly temporally, especially randomly temporally in a mutually independent manner. Randomness can be generated by a real random number generator not illustrated in FIG. 4*a*. However, pseudo-randomness is completely sufficient. Thus, each of the function transmitters $30_1$-$30_K$ could include an individual pseudo number random generator, each providing different or at least temporally varying random number sequences. A less advantageous case would be that the symbol sequence generators 54 of the function transmitters $30_1$-$30_K$ provide sequences of symbols, each comprising a deterministic phase response within the respective symbol sequence, such that the phase of a respective symbol sequence varies in time deterministically with a uniform distribution between all possible phases between 0 and $2\pi$, wherein the symbol sequences are again different to each other and advantageously even orthogonal, but then the advantage with regard to loosening the demands on synchronization within the system 28, already mentioned above and discussed in more detail below, would be lost. Thus, in the following it is assumed that these are symbol sequences with a random or pseudorandom time varying phase within the symbol sequence and that a statistical independence of the phase response between the individual function transmitters $30_1$-$30_K$ exists.

As will be shown further below, with increasing number of the symbols per symbol sequence, the accuracy of the function result at the output 62 of the function receiver 32 increases. The amplitude of the symbol sequence and hence the transmit power of the symbol sequence is adjusted by the symbol sequence generator 54, each in dependence on the respective function value at the input 42. For this, the function value is at first adapted such that as described with reference to FIG. 3, the summation 33 by the multiple-access channel 31 results in the desired function $f$. In particular, the definition range adapter 44 applies the function g, mentioned above with reference to FIG. 3, to the function value at the input 42, wherein the result $r_1(t)$ is again transformed by the pre-processing transformer 46 by the function $\phi_1$ also mentioned with reference to FIG. 3. The transmit power adjuster 48 multiplies the result of the pre-processing transformer 46 with a value $\alpha$ (cf. FIG. 3), so that the transmit power setting depending on the function variable value at the input 42 cannot lead to exceeding a specific maximum transmit power of the respective function transmitter. The factor $\alpha$ is the same for all function transmitters $30_1$-$30_K$. The same applies also to the function g and can also apply to the pre-processing function $\phi_1$-$\phi_K$. Finally, the result of the transmit power adjuster 48 is subject to root extraction by the root extractor 50, since the function value is to be encoded as transmit power at the input 42. The value obtained in that manner is then pre-distorted with the magnitude of the respective complex channel influence, as it is provided by the channel estimator 38. The magnitude of the complex channel influence is, for example, a scalar, namely the magnitude of a complex number whose phase describes the phase shift between function receiver 32 and respective function transmitter $30_1$ effected by the multiple-access channel 31, but is disregarded by the pre-distorter 52, and whose magnitude describes the respective signal weakening by the multiple-access channel. The mathematical justification that the omission or disregard of the phase does not alter the correctness of the subsequent result at the output 62 will be provided below.

Pre-distorted in that manner, the amplitude value obtained from the function variable value at the input 42 is used as amplitude of the symbols of the symbol sequence $s_1(t)$, which will then be handed to the multiple-access channel 31 via the interface $36_1$ or the antenna $36_1$ simultaneously with the respective other symbol sequences of the other function transmitters. The simultaneity necessitates no high-precision synchronization between function transmitters $30_1$ to $30_K$. For example, the function transmitters $30_1$-$30_K$ operate merely in an accuracy synchronized to one another, such that a standard deviation of the start times of the temporally overlapping symbol sequences of these transmitters 30 is smaller than a symbol period of the sequence of symbols.

In the multiple-access channel 31, the individual transmitted symbol sequences experience different complex channel influences on the way to the antenna $34_1$ of the function receiver 32, namely $h_1(t)$, for example, for the first function transmitter $36_1$. The sum 33 of the same reaches the antenna with the additively added receiver noise $n_r(t)$. The receive signal $y_1(t)=y(t)$ obtained in that way will then be examined as regards to its receive power on the receiving side in the respective receive power determiner 64, for example by squaring and integrating the receive signal across a time period of the numbers of symbols or a slightly shorter time, such as a time period reduced by a symbol time period, for example continuously by means of a squarer and integrator or by sampling the complex baseband signal with subsequent squaring and summing of the complex samples. Due to the character of the symbol sequences and the receiving side squaring it becomes obvious that the central tendency or expected value, such as the average value of the receive power determined by the determiner 64 remains unaffected, apart from the additive receiver noise n(t), by the transmitting side simplification in channel estimation in the pre-distorters 52 or channel estimators 38, or is uncorrelated to the phase or phase influence of the channel influence in the individual channels of the multiple-access channel 31.

In the present embodiment, in the processing unit 66, the receive power determined by the determiner 64 is corrected for the receiver noise of the receiver stage by subtracting the receiver noise variance. Then, the subsequent modules 68, 70 and 72 reverse the transmitter side measures in blocks 44, 46 and 48, as already described with reference to FIG. 3, to obtain a result $\hat{f}$.

Before the next embodiment will be described, some generalization options will be briefly discussed. Obviously, it is not necessitated that units 44 and 72 are provided. For example, the possible range of values of the incoming function variable values $x_1$-$x_K$ can already be matched to the allowed range. Additionally, the separation into functions g and $\phi_1$ or $\psi$ and $g^{-1}$ is not mandatory, but the two functions can also be merged with one another. The same applies to operations 48, 50 or 68 and 66. Applying the factor $\alpha$ on the transmitting side or $1/\alpha$ on the receiving side can also be omitted when exceeding a maximum transmit power is inherently excluded by the nature or range of values of the function variable values to be transmitted.

The above description describes the process of transmitting a set of function variable values $x_1$-$x_K$ on the path of the temporally overlapping transmission of symbol sequences with respectively adjusted amplitude or transmit power. How the function transmitters 30 can be synchronized and how the channel estimators 38 of the same can perform channel estimation to the antenna $34_1$ will be discussed below. The pilot transmitter 56 could be implemented to transmit a pilot signal reaching the individual function transmitters $30_1$-$30_K$ via the multiple-access channel 31 on respective return paths. By means of this pilot signal, the channel estimators 38 will then estimate the magnitude of the respective channel influence. In particular, it is for example possible that the pilot transmitter 56 uses intermittently occurring channel estimation phases for transmitting a pilot signal at the antenna. Then, the channel estimators 38 of the function transmitters estimate in the intermittently occurring channel estimation phases, the magnitude of the complex channel influence of the multiple-access channel 31 to the antenna $34_1$ of the function receiver 32, i.e. one channel influence magnitude each. Via these sequential pilot signals, the function transmitters 30 can also synchronize to a common time base, wherein, as mentioned above, the accuracy of the synchronization does not need to be great.

With reference to FIGS. 4a and 4b, an embodiment has been described where the receiving node has an antenna and pre-distortion of the channel has been performed with estimated magnitudes $|h_k(t)|$, k=1, . . . , K. The receiver type used according to FIG. 4b provided the processing unit 66 at a position within the signal chain of the function value determiner 58 after receive power determination and prior to modules 68-72 for definition range readaption, function post-processing and receive power level adjustment. Another receiver type would also be possible for FIG. 4a and will be discussed below with reference to FIG. 4c. Which of the two receiver types should be used in a respective system can depend, for example, on the respective desired function $f$ $(x_1(t), \ldots, x_K(t))$. The type according to FIG. 4b and the type according to FIG. 4c described below differ merely by the position of the processor 66 in the signal processing chain of the function result determiner 58. As described above, the processing unit 66 takes measures for communicating specific statistical characteristics, such as unbiasedness, to the function estimation $\hat{f}$. In dependence on the desired function $\hat{f}$, the position of the processing unit 66 makes a difference. If the desired function consists, for example, of the computation of an arithmetic average according to $$f(x_1(t), \ldots, x_K(t)) = \frac{1}{K}\sum_{k=1}^{K} x_k(t),$$

then the unbiased estimator for this function is given, for example by $$\hat{f}(x_1(t), \ldots, x_K(t)) = g^{-1}\left(\psi\left(\underbrace{\frac{1}{\alpha}\left(\|y(t)\|^2 - \sigma_N^2\right)}_{\text{processing unit}}\right)\right)$$

wherein $\sigma_N^2$ is the noise variance at the antenna $34_1$ known to the function receiver 32, and $\psi(x)=x$ holds true. It can be seen in the equation that for this desired function, namely the arithmetic average, the function receiver 32 should be of the type according to FIG. 4b, so that the subtractively performed correction by the processing unit 66 on the receiving noise determined by the module 64 takes place analytically at the respective position. Here, the processing unit 66 merely has the task of subtracting the noise power $\sigma_N^2$ from the result of the norm operation ($\|.\|^2$).

However, it would also be possible that the desired function corresponds, for example, to the geometric average $f(x_1(t), \ldots, x_K(t))=(\Pi_{k=1}^K x_k(t))^{1/K}$. In this case, an asymptotic unbiased estimator for this function would have the following form:

$$\hat{f}(x_1(t), \ldots, x_K(t)) = g^{-1}\left(\psi\left(\frac{1}{\alpha}\|y(t)\|^2\right)\right) \times \underbrace{\frac{1}{\mathbb{E}\left\{\psi\left(\frac{1}{\alpha}n(t)^H n(t)\right)\right\}}}_{\text{processing unit}}$$

the expected value of $n(t)^H n(t)$ and $$\psi(x) = a^{\frac{1}{K}x},$$

a>1 randomly. Here, it can be seen that the function receiver according to FIG. 4c should be used, wherein namely in contrast to the type according to FIG. 4b, the processing unit 66 is not arranged between power adjuster 68 and receive power determiner 64, but between output 62 and the definition range readapter 72. Here, the processor 66 performs a multiplication with the factor $$\mathbb{E}\left\{\psi\left(\frac{1}{\alpha}n(t)^H n(t)\right)\right\}^{-1},$$

wherein this expected value, as known to the function receiver, has, for example, been stored in advance.

In the following, the embodiment of FIG. 5a-c will be described. Elements that are equal to the ones shown in FIG. 4 will be provided with the same reference numbers in FIG. 5a-c, and a repeated description of the same is omitted for preventing repetitions. Rather, the following description concentrates on the differences to the embodiments of FIG. 4a-c. As has already been stated in the description of FIG. 4a-c, contrary to the embodiments of FIG. 4a-c, in the system 88 of FIG. 5a-c, no channel estimation takes place in the function transmitters $30_1$-$30_K$. Accordingly, the channel estimators 38 are missing in the function transmitters $30_1$-$30_K$ as well as the pre-distorters in the signal chain between function variable value input 42 and multiple-access channel interface $36_1$. In normal operating phases, the function transmitters $30_1$-$30_K$ of the system 88 of FIG. 5 rather transmit their respective symbol sequences without pre-distortion with random phase with an amplitude resulting at the output of the respective root extractor 50. The sum characteristic of the multiple-access channel 31 obviously occurs several times, as indicated by the superscript indices $1 \ldots n_R$ in the sigma signs, as well as the addition $35_1 \ldots 35_{n_R}$ and the complex channel influencing on each of the distances between the $n_R$ antennas $34_1 \ldots 34_{n_R}$ and the K transmitting antennas $36_1 \ldots 36_K$.

In the embodiment of FIG. 5a-c compared to the embodiment of FIG. 4a-c, several antennas or several receiving antennas $34_1$-$34_{n_R}$ are provided on the side of the function receiver 32, wherein obviously, as described above, $n_R$ could also be 1, wherein, however, it is assumed in the following that $n_R \geq 1$. For every antenna $34_1$-$34_{n_R}$, the function receiver 32 comprises, apart from a respective receiving amplifier with the respective receiver noise $n_1 \ldots n_{n_R}$, not illustrated in FIG. 5a-c as well as in FIG. 4a-c for clarity reasons, a respective receive power determiner $64_1$-$64_{n_R}$, which determines a receive energy, and hence a measure for a receive power of the receive signal at the respective antenna $34_1$-$34_{n_R}$, for example by squaring the magnitude and integrating the receive signal. Alternatively, instead of a squarer followed by an integrator, a sampling member can be used, which samples the complex baseband signal at the input of the function receiver, and which is followed by the squarer and summer for summing squared samples. The receive powers at the antennas $34_1$-$34_{n_R}$ determined in that manner are summed up at a summer 80 and serve as a basis for subsequent further processing starting, according to the receiver type version of FIG. 5b, with a receive power level adjuster 68' modified compared to the embodiment of FIGS. 4b and 4c, which namely multiplies the summed receive power not only by $1/\alpha$, but here exemplarily divides it also by the number of antennas $n_R$. In the signal chain of the antennas $34_1$-$34_{n_R}$ to the output 62, a channel distorter 82, the processor 66, the post-processing transformer 70 and the definition range readapter 72 follow the modified receive power level adjuster 68' in the stated order.

The channel estimation is performed on the receiving side according to the embodiment of FIG. 5a. For this, the function transmitters transmit, in intermittently occurring channel estimation phases, constant power signals, such as each of the function transmitters $30_1$-$30_K$ a signal with a power which is the same for all transmitters $30_1$-$30_K$. The constant power signals are transmitted by the function transmitters $30_1$-$30_K$ in a time overlapping manner, for example in the context of synchronization accuracy simultaneously, wherein the synchronization accuracy can be reduced, as in the embodiment of FIG. 4a-c. Thus, caused by the characteristics of the multiple-access channel 31, a summed superposition of the individual constant power signals amended with the respective complex channel influence plus the respective receiver noise $n_n(t)$ for the respective n-th antenna $34_n$ results in the antennas $34_1$-$34_{n_R}$. The function receiver 32 has no pilot transmitter but a channel estimator 90. The channel estimator 90 is provided to estimate, from a multiple-access channel signal received in the channel estimation phase, a statistical quantity to be specified in more detail below, which statistically describes the channel influence of the multiple-access channel 31 and to output this quantity to the function result calculator 58. The distorter 82 receives, from the channel estimator 90, from the above-mentioned statistical quantity for describing the channel influence, information on how the averaged receive power value output by the module 68' is to be distorted and passes the result onto the processing unit 66. The processing unit 66 again performs, in the normal operating phase, the correction of the determined receive power with the respective receiver noise, already described with reference to FIG. 4*a*-*c*. Already before that, the channel distorter 82 has provided a correction of the averaged receive power with the inverse of the channel influence. In other words, the channel distorter 82, based on the statistical quantity provided by the channel estimation 90, inverts the influence of the multiple-access channel 31 on the central tendency of the determined receive power averaged across the receiving antennas again, or balances the same. Details in this regard will be provided below. Here, it could also become clear that this correction of the channel influence can even be omitted in cases where the multiple-access channel 31 comprises specific particular characteristics. In the present embodiment, the channel estimator 90 performs its channel estimation based on the averaged receive power value, corrected by 1/α transmit power, and does so intermittently in the intermittently occurring channel estimation phases. For this, the channel estimator 90 directs the channel receiver 82 in the channel estimation phases to leave the arrival of the averaged receive power signal uninfluenced, and the channel estimator 90 is connected to the output of the channel distorter via a switch 84 which provides a connection of the output of the channel distorter 82 to the input of the channel estimator 90 in the channel estimation phases, and, in the normal operation phases, for an application, for example of a zero signal to the inputs of the channel estimator 90. The channel estimator 90 estimates, based on the incoming averaged receive power signal, statistical quantities describing the channel influence of the multiple-access channel 31, and applies a respective value inverting this channel influence across the normal operating phases to the channel distorter 82, so that the same inverts the channel influence. For example, estimating merely includes detecting the incoming receive energy or power averaged across the receiving antennas in the case of the multiple-access signal in the channel estimation phase which corresponds to a superposition of transmit signals of constant power that is especially equal between transmitters 30, since the detected or sampled average energy or power of the transmissions at the receiving antenna corresponds to the statistical second order moment. Details will be described below.

In the system of FIG. 5*a*, in contrast to the system of FIGS. 4*a, b*, the channel transmitters will not act to perform pre-distortion of the channel. Pre-distortion of the channel at the function transmitters is not possible in the case of FIG. 5*a*, since between every transmitter node and every receiving antenna, an individual channel coefficient is effective, but only a single channel parameter can be considered during transmission. But in the case of FIG. 5*b*, it also holds true that the processing unit 66 can also be arranged at a different location within the signal chain between the receiving antennas and the output of the function receiver 32. In the case of FIG. 5*b*, for example, the selection of the arrangement of the processing unit 66 within the signal chain can also depend on which desired function is to be calculated. It should be noted that first the sum across the receive energy at every antenna is formed, and subsequently the post-processings, definition range readaptations, etc. are applied. The channel estimator 90 determines in the channel estimation phases information on statistical parameters of the channel, such as $\sigma_H^2 + |\mu_H|^2$ or $\Sigma_{n,k,m}((\sigma_{nk}^{(m)})^2 + |\mu_{nk}^{(m)}|^2)$, as will be discussed below, and remembers this information in order to use the same in the intermediate normal operating phases.

Thus, in the case of FIG. 5*a*-*c*, the function transmitters and function receiver differ both in the type according to FIG. 5*b* and in the type according to FIG. 5*c*, wherein in contrast to the embodiment of FIG. 5*b*, the processing unit 66 is arranged between the output 62 and the definition range readapter 72, for example between two modes or phases, namely the channel estimation node where the function transmitters transmit with constant energy $\sigma_k(R_k)=1$, k=1, . . . , K, while the channel estimator 90 of the receiver 32 is charged with the respective estimation corresponding to the switch setting "1" in FIG. 5*b* and FIG. 5*c*. During normal operation, the function transmitters 30 transmit their preprocessed measurement value information, while the receiver 32 or the distorter 82 weighs the receive energy with the inverse of the content of the CSI box, such as $(\sigma_H^2 + |\mu_H|^2)^{-1}$ or $(\Sigma_{n,k,m}((\sigma_{nk}^{(m)})^2 + |\mu_{nk}^{(m)}|^2))^{-1}$, which corresponds to the switch setting "0" in FIGS. 5*b* and 5*c*.

The rest of the structure of system 88 of FIG. 5*a*-*c* is identical to the one described with reference to FIG. 4*a*-*c*, which is why a detailed discussion will be omitted, and rather several simulation results and a mathematical illustration of the underlying ideas of the above embodiments will be discussed.

The above embodiments showed options how, for example, a wireless sensor network or any other network can be regarded as a collection of sensor or transmitting nodes monitoring or reading out specific information sources, processing data collected in that way and transmitting the same to a sink or receiving node, with the aim of calculating a function of the measurement values or values obtained in a different way at the receiving node. For that purpose, in contrast to the solution described in the introductory part of the description, which uses underlying fading or wakening multiple-access channel with complete estimation of the channel state information, in the following referred to as a full CSI (Channel State Information), the problem is addressed that the channel estimation effort is to be reduced. In the following, an explanation will be given that it is possible to use less channel state information, such as at the sensor nodes, for effectively obtaining good estimations. The following proof will show, for example, that no performance loss is effected, independent of the fading distributions, when instead of perfect or complex-valued channel state information, every sensor node is only provided with the magnitude of a respective channel influence, such as channel coefficient. It will also be shown that in the case of specific independently distributed fading environments, and in particular in the case of several antenna elements at the receiving node, knowledge of channel state information at the sensor nodes is not necessitated, and a very simple and still very effective correction of fading effects can be performed on the receiving side, based on specific statistical channel knowledge which will be discussed in more detail below. In some cases, fading improves the estimation accuracy due to the multiple-access nature of the underlying channel.

A basic assumption in the articles mentioned in the introductory part of the description of the present application was, as stated above, perfect knowledge of complex-valued channel state information at the sensor nodes prior to transmissions, which will be referred to below as "full CSI", such that every node was able to perfectly invert its own channel to the receiving node or to perform perfect pre-distortion. In the following, first, the adverse effect of the resulting function result value at the receiving node due to fading will be analyzed and the question how much channel state information is necessitated at all at the sensor nodes or the receiving nodes will be addressed. It will be shown that independent of the fading distributions the magnitude of the channel coefficients is sufficient to perform estimation without performance losses compared to full CSI. This alleviated variation of channel estimation is referred to as "modulus CSI", wherein here modulus means "magnitude". Above that, it will be shown that for specific independently distributed fading environments, channel estimation information at the sensor nodes is not necessitated at all, and the fading effects can be corrected by using the second order statistical channel knowledge on the receiving side. Consequently, the results substantiate what has already been used in the above embodiments, namely that the magnitude of channel knowledge at the nodes can be significantly reduced compared to perfect channel knowledge, even without performance losses, which is equivalent to reduced complexity and much higher energy efficiency of the overall network.

In advance, it should be noted that in the following $(\bullet)^T$ is a transpose, $(\bullet)^H$ a Hermitian transpose and $(\bullet)^*$ the complex conjugate of the respective bracket expression. The real and complex-valued proportion of normal distributions with average or mean $\mu$ and variance $\sigma^2$ will be described by $\mathcal{N}_R(\mu, \sigma^2)$, $\mathcal{N}_C(\mu, \sigma^2)$ and $\oplus$ denotes the direct sum of the respective matrixes.

In the following, a wireless sensor network will be described as an example for one of the possible systems, in which the above embodiments can be used, and this sensor network consists of $K \in \mathbb{N}$ identical spatially distributed single-antenna sensor nodes and one designated receiving node equipped with $n_R \in \mathbb{N}$ antenna elements. This sensor network forms, exemplarily for other possible networks, the basis of the following considerations.

Let an appropriate probability space $(\Omega, \mathcal{A}, \mathbb{P})$ be given, with sample space $\Omega$, $\sigma$-Algebra $\mathcal{A}$ and probability measure $\mathbb{P}$ over which all appearing random variables and stochastic processes are defined. Every sensor node has the object to observe a specific physical phenomenon, such as temperature or pressure or the same, and these observations will be modeled below as time-discrete stochastic processes $X_k(t) \in \chi$, $k=1, \ldots, K$, $t \in \mathbb{Z}_+$ over time t, wherein $\chi = [x_{min}, x_{max}] \subset \mathbb{R}$ denotes the physical measurement range, i.e. the range in which measurement results from the physical phenomenon observations lie. Finally, without limiting the generality, it is assumed that the sensor readings or sensor values $x(t):=(X_1(t), \ldots, X_K(t))^T \in \chi^K$ are independent and identically distributed, which will be abbreviated below by "i.d.d.", i.e. like in a scenario where the sensors observe identical values, subject to i.d.d. observation noise.

With these specifications, the most important building blocks for the following considerations will be defined in a precise form.

Definition 1 (SIMO-WS-MAC)

Let $x(t) \in \chi^K$, $t \in \mathbb{Z}_+$ be the sensed data, $n_R \in \mathbb{N}$ the number of receiving antennas of the receiving node and let sensor nodes be restricted to a peak power constraint of $P_{max} \in \mathbb{R}_{++}$. Additionally, let $H_{nk}(t)$, $n=1, \ldots, n_R$; $k=1, \ldots, K$ be a complex-valued flat fading process between the kth sensor and the nth receiving antenna element, and $N_n(t)$, $n=1, \ldots n_R$ the time-discrete stationary receiver noise process at antenna element n. Further, it is assumed that the data, the fading and the noise are mutually independent. When this is the case, the vector-valued map $$(X_1(t), \ldots, X_K(t)) \mapsto (Y_1(t), \ldots, Y_{n_R}(t)) \in \mathbb{C}^{n_R}, Y_n(t) = \sum_{k=1}^{K} H_{nk}(t) X_k(t) + N_n(t), n=1, \ldots, n_R,$$ (1)

Is referred to as the SIMO-Wireless Sensor Multiple-Access Channel (SIMO-WS-MAC). For $n_R=1$, this channel is simply referred to as WS-MAC.

The SIMO-WS-MAC is a collection of K SIMO-links sharing the common radio interface per multiple-access. Equation 1 provides the mathematical characteristic of the WS-MAC, namely summation, which can be explicitly used for desired function computation, if there is a match between the desired function and the underlying multiple-access channel.

Definition 2 (Desired Function)

$\mathcal{F}_D$ is the set of desired functions $f: \chi^K \to \mathbb{R}$ of measured sensor data.

Definition 3 (Pre-Processing Functions)

The functions $\phi_k: \chi \to \mathbb{R}$, $k=1, \ldots, K$ are defined, which operate on the sensed data $X_k(t) \in \chi$ as the pre-processing functions.

Definition 4 (Post-Processing Function)

Let $Y(t) \in \mathbb{C}$ be the output signal of the WS-MAC. Then, the injective function $\psi: \mathbb{R} \to \mathbb{R}$, operating on $Y(t)$ defines the post-processing function.

Remark 1

The pre and post-processing functions, which obviously depend on the desired function, transform the WS-MAC in such a way that the resulting mathematical characteristic of the overall channel matches the characteristic of the desired function. In the case of geometric average or mean as the desired function (cf. Example 1), for example, the overall channel is a multiplicative multiple-access channel. Therefore, theoretically, the set of desired functions has the form $\mathcal{F}_D = \{f(x(t)) | f(x(t)) = \psi(\Sigma_k \phi_k(X_k(t)))\}$.

Example 1

(i) Arithmetic average:

$$f(x(t)) = \frac{1}{K} \sum_{k=1}^{K} X_k(t)$$

with pre-processing functions $\phi_k(X_k(t)) = \phi(X_k(t)) = X_k(t)$, $k=1, \ldots, K$ and post-processing functions $$\psi(Y(t)) = \frac{1}{K} Y(t).$$

(ii) Geometric average:

$$f(x(t)) = \left( \prod_{k=1}^{K} X_k(t) \right)^{\frac{1}{K}},$$

$X_k(t) > 0$ $\forall k, t$ with the pre-processing functions $\phi_k(X_k(t)) = \phi(X_k(t)) = \log_a(X_k(t))$ $\forall k, t$, and a post-processing function $$\psi(Y(t)) = a^{\frac{1}{K} Y(t)},$$

wherein a is an arbitrary base.

The arising problem which will be analyzed below is the following: How can the elements of $\mathcal{F}_D$ be computed in an energy-efficient and reliable way by using the SIMO-WS-MAC, with a minimum magnitude of necessitated channel knowledge?

Since a precise symbol- and phase synchronization as described in the approach of Nazer und Gastpar in the introductory part of the description of the present application, is hard to obtain in reality and in particular for large sensor networks, in the following, the approach is considered according to which, for function value transmission at a time t, every sensor node generates a complex-valued transmit sequence of the length M∈N with unit norm, such that for example for the kth sensor, $s_k(t)=(S_{k1}(t), \ldots, S_{kM}(t))^T \in C^M$, $k=1, \ldots, K$ and $|s_k|_2^2 \forall k$. The preprocessed sensor information $\phi(X_k(t))$ is then used as transmit energy for the generated sequence $s_k(t) \forall k$. Since the transmit powers are positive real numbers, it has to be ensured that $\phi_k(X_k(t)) \geq 0 \ \forall k,t$. Consequently, we change the domains of $\phi_k$ by a bijective function $g: \chi \to \mathcal{R}$, i.e. $R_k(t) := g(X_k(t))$, which depends on $\phi$ such that $\mathcal{R}$ is the new domain fulfilling the requirement for all k, t. For more details, reference is made to the paper by Goldenbaum, Stanczak und Kaliszan stated in the introductory part of the description of the present application.

For simplicity reasons—but without restricting the generality—perfect block synchronization is assumed in the following, although this is not necessitated as has already been described with reference to FIG. 4. By that assumption, however, the mth output symbol of the SIMO-WS-MAC at antenna n can be written as $$Y_{nm}(t) = \sum_{k=1}^{K} H_{nk}^{(m)}(t) \sqrt{\alpha \varphi_k(R_k(t))} \, S_{km}(t) + N_{nm}(t), \quad (2)$$

$n=1, \ldots, n_R$; $m=1, \ldots, M$. Here, it should be noted that the synchronization assumption is already not necessitated since the described approach is relatively robust against imperfections in block synchronization. The constant $\alpha > 0$, which has also already been mentioned with reference to FIGS. 4 and 5, ensures transmit power constraints, i.e.

$$0 \leq \frac{\alpha \varphi(R_k(t))}{M} \leq P_{max},$$

while $$N_{nm}(t) \sim \mathcal{N}_C\left(0, \frac{1}{M} \sigma_N^2\right)$$

$\forall n, m, t$ with independent real and imaginary parts each with variance $$\frac{1}{2M} \sigma_N^2,$$

describes the receiver noise on the nth antenna and for the mth symbol. The channel output signals are combined in the matrix $Y(t) = (Y_{nm}(t)) \in C^{n_R \times M}$, the channel coefficients in a sequence of M matrices $H_m(t) = (H_{nk}^{(m)}(t)) \in C^{n_R \times K}$, the K transmit sequences in a matrix $S(t) := (s_1(t), \ldots, s_K(t))^T \in C^{K \times M}$ the additive noise terms in $N(t) = (N_{nm}(t)) \in C^{n_R \times M}$ and the K transmit powers in the diagonal matrix $F(t) := \text{diag}(\Phi_1(t), \ldots, \Phi_K(t)) \in R_+^{K \times K}$, wherein $\Phi_k(t) := \sqrt{\alpha \phi_k(R_k(t))}$, $k=1, \ldots, K$, such that all receive signals (2) can be captured in a vector equation $$vec(Y(t)) = \left(\bigoplus_{m=1}^{M} H_m(t)\right) vec(F(t)S(t)) + vec(N(t)). \quad (3)$$

If further $\tilde{y}(t) := vec(Y(t)) \in C^{n_R M}$, $\tilde{s}(t) := vec(F(t)S(t)) \in C^{MK}$, $\tilde{n} := vec(N(t)) \in C^{n_R M}$, and $$\tilde{H}(t) := \bigoplus_{m=1}^{M} H_m(t) = \begin{pmatrix} H_1(t) & 0 & 0 & 0 \\ 0 & H_2(t) & 0 & 0 \\ \vdots & \vdots & \ddots & \vdots \\ 0 & 0 & 0 & H_M(t) \end{pmatrix}, \quad (4)$$

wherein $\tilde{H}$ is an element of $C^{Mn_R \times MK}$, equation (3) reduces to $$\tilde{y}(t) = \tilde{H}(t)\tilde{s}(t) + \tilde{n}(t) \quad (5)$$

In the following, explicit designation of the measurement time instance t is omitted.

For obtaining the desired function value of Equation (5), first, the receive sum energy, i.e, the sum over all antennas and symbols, is calculated, i.e.

$$\tilde{y}^H \tilde{y} = \frac{\alpha}{M} \sum_{n=1}^{n_R} \sum_{m=1}^{M} \sum_{k=1}^{K} |H_{nk}^{(m)}|^2 \varphi_k(R_k) + \quad (6)$$

$$\sum_{n=1}^{n_R} \Delta_{1,n}(\tilde{H}, F, S) + \sum_{n=1}^{n_R} \Delta_{2,n}(\tilde{H}, F, S, N) + \sum_{n=1}^{n_R} \Delta_{3,n}(N),$$

followed by simple computations comprising an application of $\psi$, $g^{-1}$. The error terms in Equation (6) are $$\Delta_{1,n}(\tilde{H}, F, S) := \sum_{m=1}^{M} \sum_{k=1}^{K} \sum_{\substack{l=1 \\ l \neq k}}^{K} (H_{nk}^{(m)})^* H_{nl}^{(m)} \Phi_k \Phi_l S_{km}^* S_{lm} \quad (7)$$

$$\Delta_{2,n}(\tilde{H}, F, S, N) := 2 \sum_{m=1}^{M} \sum_{k=1}^{K} \Phi_k Re\{H_{nk}^{(m)} S_{km} N_{nm}^*\} \quad (8)$$

$$\Delta_{3,n}(N) := \sum_{m=1}^{M} |N_{nm}|^2, \quad (9)$$

which will be summarized below to the overall error summand $$\tilde{\Delta}(\tilde{H}, F, S, N) := \sum_{n=1}^{n_R} (\Delta_{1,n} + \Delta_{2,n} + \Delta_{3,1}). \quad (10)$$

An adequate generation of sequences $s_k$, $k=1, \ldots, K$ simultaneously reducing the error terms $\Delta_{1,n}$, $\Delta_{2,n}$ a matter of sequence design, i.e. a question of generating suitable sequences which will not be considered further below but would obviously be possible. The possibility used below is to choose the elements of $s_k(t)$ in such a manner that the same act like uncorrelated noise, such that $\Delta_{1,n}$, $\Delta_{2,n}$ disappear on average. Therefore, the nodes generate for any $m=1, \ldots, M$ the sequence elements $S_{km}(t) = M^{-1/2} e^{i\Theta_{km}(t)}$, i.e.

$$S_k(t) = (S_{k1}(t), \ldots, S_{kM}(t))^T = \frac{1}{\sqrt{M}}(e^{j\Theta_{k1}(t)}, \ldots, e^{j\Theta_{kM}(t)})^T \ \forall k$$

wherein $i^2=1$ and $\Theta_{km}(t)$ is i. i. d. uniformly distributed in $[0,2\pi) \ \forall k,m,t$.

In the following, the impact of fading effects on the computation of functions over a WS-MAC is analyzed, using the scheme which has just been described above. In this context, different assumptions regarding the channel knowledge at sensor nodes and the receiving node are made. Above that, considering multiple antennas at the receiver is legitimized by showing that in specific fading environments, multiple antennas improve the function reconstruction quality and above that enormously reduce channel estimation effort, wherein, on the other hand, it should be noted that in the following channel estimation errors are exempt from the considerations.

First, the special case $n_R=1$ is considered. The behavior of the WS-MAC (cf. definition 1) has the effect that no kind of instantaneous channel knowledge at the receiver side can be used to correct fading effects, since the receiving node merely has access to a noisy linear combination of (2) but no access to any individual term in the sum. Therefore, in the approach as mentioned in the introductory part of the present application, it has been assumed that the "complex" channel coefficients are estimated at sensor nodes to invert the channel prior to transmission, which is currently referred to as "Full CSI" and could be performed, for example in that the sink node initiates function value transmissions by pilot sequences. According to Full CSI, the kth sensor transmits $k=1,\ldots,K$, $\sqrt{\alpha\varphi_k(R_k)}S_{km}/H_{1k}^{(m)} \ \forall m$, $|H_{1k}^{(m)}|>0$, which will serve as a benchmark for the embodiments below, according to which less channel state information is used. Here, however, it should be noted that by careful selection of a factor $\alpha>0$ it should be ensured that $$\frac{\alpha\varphi_k(R_k(t))}{M|H_{1k}^{(m)}|^2} \leq P_{max},$$

in order to satisfy transmit power constraints on nodes.

The approach of setting the transmit energy of the random sequences equal to the processed sensor data has the advantage that the first summand in the Equation (6), i.e.

$$\frac{\alpha}{M}\sum_{n,m,k}|H_{nk}^{(m)}|^2\varphi_k(R_k),$$

which is the term of interest in the entire receive energy, is merely affected by the "squared modulus" of the instantaneous channel coefficients. Consequently, the questions arises: is an estimation of the complex channel coefficients, which would require sensitive phase estimation, necessary on the sensor nodes or is it sufficient to estimate merely the absolute values of the channel coefficients, which is referred to as "Modulus-CSI" below? This would obviously be an improvement with respect to channel estimation effort and channel estimation accuracy, and it will be shown in the following that these advantages can actually be obtained by Modulus-CSI.

The fact that the entire error term (10) comprises the expectation value $\sigma_N^2$, is essential for the case of perfect channel inversion, since it can be easily shown that $\Delta_{1,1}, \Delta_{2,1}$ have an average or a central tendency of zero and $\mathbb{E}\{\Delta_{3,1}\}=\sigma_N^2$. This is necessitated to formulate an unbiased estimator $\hat{f}$ for the desired function $f$ at the receiver based on Equation (6), since $\sigma_N^2$ is known for the sink or the receiver and can be simply subtracted (cf. 66 in FIGS. 4b,c and 5b,c). However, the question arises whether such an estimator is also unbiased for the case of Modulus-CSI, i.e. for the case that the kth sensor transmits $\sqrt{\alpha\varphi_k(R_k)}S_{km}/|H_{1k}^{(m)}|$ instead of $\sqrt{\alpha\varphi_k(R_k)}S_{km}/H_{1k}^{(m)}$. To answer this question, error terms $\Delta_{1,1}$ (7) and $\Delta_{2,1}$ (8) have to be analyzed, which depend on channel coefficients. It is obvious that $\mathbb{E}\{\Delta_{2,1}\}=0$, since the zero average noise terms $N_{1m}$, $m=1,\ldots,M$ are independent of sensor readings and fading. For the case of $\mathbb{E}\{\Delta_{1,1}\}$ this is not immediately clear, so that it will have to be proven below.

Proposition 1

Let $H_{1k}^{(m)}$, $|H_{1k}^{(m)}|>0$ be the random complex channel coefficient between the kth sensor node and the receiver at the receive symbol m. Then, without any performance losses, channels can be corrected by the magnitude $|H_{1k}^{(m)}|$ prior to transmissions $\forall k,m$, independent of the fading distributions.

To prove this proposition, the following lemma is useful.

Lemma 1

Let A,B be real independent random variables. If one of both is uniformly distributed in $[0,2\pi)$, then the reduced sum $C=(A+B) \mod 2\pi$ is also uniformly distributed in $[0,2\pi)$, independent of the distribution of the other random variables.

The proof of Lemma 1 can be easily provided, but is omitted here. The proof of Proposition 1 can be provided as follows. If the complex fading coefficients are written between the kth sensor $k=1,\ldots,K$, and the sink node at symbol m, $m=1,\ldots,M$, in polar form, $H_{1k}^{(m)}=|H_{1k}^{(m)}|e^{i\Lambda_{1k}^{(m)}}$, wherein $\Lambda_{1k}^{(m)}$ is the corresponding random phase, then, by using Modulus-CSI, Equation (7) can be written as $$\Delta_{1,1} = \frac{2}{M}\sum_{l=2}^{K}\sum_{k=1}^{l-1}\sum_{m=1}^{M}\Phi_l\Phi_k \cos\left(\underbrace{\Lambda_{1l}^{(m)} - \Lambda_{1k}^{(m)}}_{=:\Delta\Lambda_{lk}^{(m)}} + \underbrace{\Theta_{lm} - \Theta_{km}}_{=:\Delta\Theta_{lk}^{(m)}}\right). \quad (11)$$

It is not surprising that the absolute values of channel coefficients are eliminated, but the random phases of fading coefficients still influence the function value quality. Let $Z_{lk}^{(m)}:=\Delta\Lambda_{lk}^{(m)}+\Delta\Theta_{lk}^{(m)}$, $C_{lk}^{(m)}:=\cos(Z_{lk}^{(m)})$ and additionally, it should be noted that the $Z_{lk}^{(m)}$ random variables reduced mod $2\pi$.

A sufficient condition for $\mathbb{E}\{\Delta_{1,1}\}=0$ is $\mathbb{E}\{C_{lk}^{(m)}\}=0 \forall l$, k,m, which should be valid for any distributions of phase differences $\Delta\Lambda_{lk}^{(m)}$.

Since, according to Lemma 1, $\Theta_{lm}, \Theta_{km}$ are independent and identically distributed in $[0,2\pi) \ \forall m,k,l \neq k$, the differences $\Delta\Theta_{lk}^{(m)}$ are also identically distributed in $[0,2\pi)$. Moreover, $\Delta\Theta_{lk}^{(m)}$ and $\Delta\Lambda_{lk}^{(m)}$ in Equation (11) are stochastically independent $\forall m,k,l\neq k$, and a repeated application of Lemma 1 shows that all $Z_{lk}^{(m)}$ are identically distributed in $[0,2\pi)$. Therefore, $\mathbb{E}\{C_{lk}^{(m)}\}=0$, $\forall m,k,l\neq k$, since the densities of cosinus functions with random arguments identically distributed in $[0,2\pi)$ are symmetric around zero, which can be proven by a common random variable transformation. Finally, it follows that $\mathbb{E}\{\Delta_{1,1}\}=0$ from the linearity of expextation value operator and the independence between $C_{lk}^{(m)}$ and the sensor readings.

The above statements show that a reduced channel estimation on the transmitter side considering merely the magnitude of the complex channel influence is possible without losses in function result accuracy but with huge savings in channel estimation effort or accuracy gain in channel estimation to be performed.

In the following, it is shown that in the case of independent fading distributions no channel knowledge on sensor nodes is necessitated if the sensor node has some statistical knowledge about fading coefficients. Correlated fading will not be discussed in more detail, but even with correlated fading, Modulus-CSI or No-CSI, as the case of a missing channel estimation on the side of the transmitter is referred to below, would be possible. In other words, when merely elements $\mathcal{F}_D$ with the characteristic $\phi_1 = \ldots = \phi_K = \phi$ are considered, such that apart from the mapped i. i. d. sensor readings $R_k = g(X_k)$ also the pre-processed sensor data $\phi(R_k)$ are i. i. d, the averaging behavior of the SIMO-WS-MAC itself contributes to dramatically reduce channel estimations effort.

It is assumed that the fading coefficients are constant during transmission of any sequence of the length M. For the specialcase of block fading, the direct sum in Equation (4) is reduced to the Kronecker product $\tilde{H} = I_M \otimes H$, wherein $H \in \mathbb{C}^{n_R \times K}$ applies and $I_M$ is the M×M identity matrix. Further, it is assumed that the fading elements $H_{nk}$ of H, which are now independent of m, are independent and identically distributed random variables with finite first absolute moments $E\{H_{11}\} = E\{H_{nk}\} = \mu_H$, $Re\{\mu\}$, $Im\{\mu_H\} < \infty$, and finite variance $Var\{H_{11}\} = Var\{H_{nk}\} = \sigma_H^2 > 0$. Then, the mathematical characteristic of the SIMO-WS-MAC can be explicitly used by the sink node to correct fading effects in the first term of Equation (6), which significantly reduces the channel estimation effort compared both to Full and Modulus-CSI.

Proposition 2

Let the first absolute moment of $|H_{11}|^2 \phi(R_1)$ and the expected value $\mathbb{E}\{\phi(R_1)\}$ exist, and additionally, let K,$n_R$ be sufficiently large. Then, if $\sigma_H^2$ and $\mu_H$ are known to the receiving node, the performance losses due to the lack of CSI at the transmitting node is arbitrarily small, provided that Equation (6) is divided by $\sigma_H^2 + |\mu_H|^2$ at the receiving node (cf. 82 in FIGS. 5b,c).

Corollary 1

For the case $\sigma_H^2 + \mu_H^2 = 1$ and $n_R$,K sufficiently large, no channel correction is necessitated.

Remark 2

Proposition 2 and Corollary 1 merely represent results for the behavior of the first term in Equation (6), which is the term of interest, and do not express anything about the behavior of error terms $\Delta_{1,n}, \Delta_{2,n}, n=1, \ldots, n_R$. If, for example, deterministic components exist in the channel statistics, i.e. $E\{Re\{H_{nk}^{(m)}\}\} \neq 0$ and/or $E\{Im\{H_{nk}^{(m)}\}\} \neq 0$, it can be shown by simple computations that $\mathbb{E}\{\Delta_{1,n}\}$, $\mathbb{E}\{\Delta_{2,n}\} \equiv 0$ $\forall n$ still holds, independent of fading distributions, such that no systematic error occurs.

The above results show that for independent and identically distributed (i.i.d.) fading coefficients which are constant for a specific predetermined channel realization over time, channel state information at the sensor nodes is not mandatory, and that fading effects on the receiving side can be corrected by some second order statistical knowledge. Above that, the number $n_R$ of receiving antenna elements affects the rate of convergence in the law of large numbers due to the fact that the averaging includes J=$n_R$K summands. Consequently, $n_R$=2 already generates a significant power gain (cf. Example 2).

Remark 3

It should be noted that Proposition 2 gives an indication for an adequate estimation of $\sigma_H^2 + |\mu_H|^2$ which is necessitated for a receiving node, such as during network initializations or channel estimation phases. For example, during such a network initialization phase, all transmitting nodes transmit $\phi(R_k)=1$ for large enough number M, such that the receiving node immediately receives a sufficient estimation of the absolute second moment.

In the immediately preceding discussion, the fading coefficients were constant for a frame of M symbols, such that the first term in Equation (6) was constrained to a double sum across antennas n and sensors k. Now, in the following, another extreme will be considered, where fading is not only independent and identically distributed (i.i.d.) over sensors and antennas, but also independent and identically distributed over time, as it is the case in a fast fading situation. Compared to the block fading scenario, the first triple sum in Equation (6) has, for this case, J=$n_R$KM independent and identically distributed summands. Consequently, Proposition 2 can be applied again, wherein, however, the rate of convergence is increased by a factor M, such that in the context of function computation, a fast fading situation is even advantageous.

Example 2

Numerical Example

Here, for example, the widespread special case of uncorrelated Rician fading is considered: $H_{nk}^{(m)} \sim \mathcal{N}_C(0.5, 0.75)$ $\forall n,k,m$. Assume the network example consists of K=25 nodes having a sequence length of M=15. The sensor readings are independent and identically distributed in $\chi=[2,14]$, the desired function is "arithmetic average", $\sigma_N^2=1$ and the performance measure is $\mathbb{P}(|E| \geq \epsilon)$, with $\epsilon \geq 0$, i.e. the probability that the relative estimation error $|E|:=|(\hat{f}-f)|f|$ is greater than or equal to $\epsilon$. A comparison of block fading and the i.i.d. case for $n_R$=2.4 by Monte-Carlo simulations is shown in FIG. 6.

FIGS. 6 and 7 illustrate the large potential of the idea of no-CSI based on simulation results. As performance measure for the comparisons, the probability $\mathbb{P}(|E| \geq \epsilon)$ that the magnitude of the relative function estimation error, i.e.

$$|E| = \left| \frac{\hat{f} - f}{f} \right|$$

is greater than or equal to $\epsilon > 0$ has been chosen. A Rice fading scenario has been assumed in that $\sigma_H^2 + |\mu_H|^2 = 1$ is fulfilled. The curves for two differently sized sensor networks (K=250 nodes and K=25 nodes) show that by adding only a single antenna at the receiving node ($n_R$=2) the estimation quality is already better as if the channel would be completely and perfectly known on every node.

Thus, FIGS. 6 and 7 show a comparison between the case of existing perfect channel information on the sensor node in the case of using a receiving antenna (full CSI) to the case of no channel information on sensor nodes with $n_R$=2,4 receiving antennas, in an uncorrelated Rice Block Fading and Rice i.i.d. Fading Scenario.

The assumption that the fading coefficients are statistically independent and identically distributed can be weakened. If the coefficients are statistically independent but not identically distributed with averages $\mu_{nk}$ and variances $\sigma_{nk}^2$, it is sufficient, when $n_R$,K are sufficiently large, to correct the influence of the channels by division by $\Sigma_{n=1}^{n_R} \Sigma_{m=1}^{M} \Sigma_{k=1}^{K} ((\sigma_{nk}^{(m)})^2 + |\mu_{nk}^{(m)}|^2)$ at the receiver, which is performed, as described above, in module 82 in FIG. 5.

Finally, there is the question how $\sigma_H^2+|\mu_H|^2$ or $\Sigma_{n=1}^{n_R}\Sigma_{m=1}^{M}\Sigma_{k=1}^{K}((\sigma_{nk}^{(m)})^2+|\mu_{nk}^{(m)}|^2)$ can be provided to the receiving node? Since it can be assumed that these long-term statistics of a channel only change very slowly over time, the sensor nodes transmit, for example, at specific intervals—in the above-mentioned channel estimation phases—a sequence of the length c·M, with c>1 integer and sufficiently large and the transmit power $\alpha\phi_k(R_k)\equiv 1$. Then, the receiving node immediately receives an estimation of the desired statistical moments.

Here, it should be explicitly noted that the described embodiments are not limited to independent fading environments. To a certain extent, the individual channel coefficients can also be correlated to each other, which does not affect the applicability of the methods.

The above-described embodiments can, as should be emphasized, do without a special protocol structure as it is mandatory in the solutions described in the introductory part of the description. At least, the protocol structure is significantly simpler if the same has to be used. Thus, the above embodiments provide a large degree of energy efficiency, have very low complexity, do not need significant synchronization effort, necessitate no analog/digital conversion of measurement data, are very robust and easy to implement in practice. However, the most decisive advantage of the above-described embodiments is the greatly reduced effort for channel estimation at the individual sensor nodes. If the application environment in the sense of radio connections even has specific characteristics, some of the above-described embodiments use the same for completely doing without channel estimation on the transmitting side or even completely, which results in immense resource savings in sensor networks, since competing methods without respective channel estimation would only be usable in a very limited manner or not at all.

Thus, the above embodiments can be used in a very large number of different wireless sensor network applications where reconstruction of measurement value information of individual nodes is not of primary interest and the receiving node is, instead, interested in a desired function of sensor data. Additionally, usage of the above-described embodiments is suitable as module in clustered networks for compressing measurement value information at a cluster head, whereby the magnitude of information to be transmitted in the overall network can be drastically reduced. Further, usage for "physical network encoding" is possible, since the same represents the special case of linear functions.

FIGS. 8a to 8f show a comparison of modulus CSI, here also referred to as CoMAC, with a primitive sensor network where sensor values are transmitted by means of uncoded TDMA. Here, uniform quantization of the "physical measurement range" existed, namely [−55.125]° C. with R∈{4,6, 8} bits. The measurement values $X_k$ were identically distributed in the interval 100 [2.14]° C. ∀k. The sequence length M was K×R. In other words, the same transmission time was chosen for both function network schemes, i.e. modulus CSI and separate variable value transmission with TDMA and function computation. As an adequate SNR formulation, the following was used, wherein all transmit energy costs for both schemes were considered:

$$\overline{SNR}_{TDMA} := \alpha \text{ expected value}\{\phi_k(R_k)\}\frac{2M}{R\cdot\sigma_N^2} \Rightarrow \overline{SNR}_{dB} = 10\log_{10}(\overline{SNR}_{TDMA})$$

As a performance measure, the absolute value of the relative error was used, i.e.

$$|E| := \left|\frac{\hat{f}-f}{f}\right|.$$

In summary, it can be stated regarding the embodiments that it is possible to use, by these embodiments, channel superpositions in a wireless MAC to calculate desired functions, wherein pre-processing and post-processing functions can extend the natural mathematical characteristic of the wireless MAC, such that, apart from "addition", also the arithmetic operation "multiplication" and more are possible. A symbol-wise approach necessitating a symbol-accurate synchronization is not necessitated in the above-described embodiments. The embodiments encoded the measured information as transmit powers of random phase sequences, so that no precise synchronization was necessitated. The protocol effort is also low. All in all, a drastic reduction of channel estimation effort results.

Returning to FIGS. 4a-c and FIGS. 5a-c, the above statements showed that blocks 44, 46, 48 and 50 mapped the respective function variable value to be transmitted at the input 42 by matching the definition range to that definition range necessitated for encoding as transmit power and by matching or ensuring the compliance with the transmit power limit to an amplitude value, which is then used as the amplitude for the respective symbol sequence, which is simultaneously passed on to the other function transmitters on the multiple-access channel 31 in an amplitude-modulated manner. In the case of FIGS. 4a-c, pre-distortion will be performed with the inverse of the magnitude of the complex channel influence at the amplitude-setting value. At every receiving antenna, sum superposition of the symbol sequences results, whose squared modulus integrated over the length of the function sequences has an expectance value which, according to the embodiment of FIGS. 4a-c, has to be merely subtractively corrected by the respective receiver noise in module 66. According to the embodiment of FIGS. 5a-c, before, by dividing the receive power by the sum of squares of average and variance of the channel influence or the sum of the second moments of the individual channel influences for the individual distances between the receiving antennas on the one side and the transmitters on the other side, as it results by estimation from the reception of a superposition of constant power signals at the respective receiving antenna and particularly from an evaluation of the summed-up receive powers at the individual receiving antennas which are transmitted by the function transmitters, channel distortion is performed. Modules 72, 70 and 68 provide merely for the retransformation of the receive power value into the function variable definition range domain. Here, it should particularly be noted that all the components between input 42 and output 54 or input $34_1$ and output 62 can be implemented analogously, i.e. in analog circuit technology.

It should be noted that in the above embodiments, the respective system description, for example in FIGS. 4a-5c, was in the complex baseband, which is why components of function receiver and function variable transmitter effecting the transition from carrier signal domain into complex baseband, such as demodulators, modulators, mixers, etc., are not explicitly stated, but are obviously part of the respective system, such as at the transmitter output or receiver input, and which is why particularly the occurring channel, noise and receiving quantities used in the above description are complex-valued. For example, a modulator can exist at the output of the respective function variable transmitter between antenna $36_\#$ and symbol generator 54, for modulating real part and imaginary part of the complex symbols to vibration signals of the same carrier frequency respectively offset by 90°, and for subsequently mixing the latter for obtaining the modulated carrier signal and a respective demodulator, such as an I/Q demodulator, for example, can exist at the input of the function receiver between the antenna $34_\#$ and the power determiner 64.

Although some aspects have been described in the context of an apparatus, it is obvious that these aspects also represent a description of the respective method, so that a block or a device of an apparatus can also be seen as a respective method step or feature of a method step. Analogously, aspects described in the context of or as a method step also represent a description of a respective block or detail or feature of a respective apparatus.

Depending on implementation requirements, embodiments of the invention can be implemented in hardware or in software. The implementation can be made by using a digital memory medium, for example a floppy disc, a DVD, a Blu-ray disc, a CD, an ROM, a PROM, an EPROM, an EEPROM or a FLASH memory, a hard drive or any other magnetic or optic memory having electronically readable control signals stored thereon, which can cooperate or cooperate with a programmable computer system such that the respective method is performed. Thus, the digital memory medium can be computer-readable. Some embodiments according to the invention comprise a data carrier comprising electronically readable control signals that can cooperate with a programmable computer system such that one of the methods described herein is performed.

Generally, embodiments of the present invention can be implemented as computer program product with program code, wherein the program code is effective to perform one of the methods when the computer program product runs on a computer. The program code can, for example, also be stored on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein when the computer program runs on a computer. A further embodiment of the inventive method is hence a data carrier (or a digital memory medium or a computer-readable medium) on which the computer program for performing one of the methods described herein is stored.

A further embodiment of the inventive method is hence a data stream or a sequence of signals representing the computer program for performing one of the methods described herein. The data stream or the sequence of signals can, for example, be configured to be able to be transferred via a data communication connection, for example via the internet.

A further embodiment comprises a processing means, for example a computer or a programmable logic device configured or adapted to perform one of the methods described herein.

A further embodiment comprises a computer on which the computer program for performing one of the methods described herein is installed.

In some embodiments, a programmable logic device (for example a field-programmable gate array, a FPGA) can be used for performing some or all functionalities of the methods described herein. In some embodiments, a field-programmable gate array can cooperate with a microprocessor to perform one of the methods described herein. Generally, in some embodiments, the methods are performed by any hardware apparatus. The same can be a universally usable hardware such as a computer processor (CPU) or a hardware-specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A function receiver for determining a function result of a plurality of function variable values from a plurality of function variable value transmitters, comprising:

an antenna, wherein the function receiver is configured to receive, in a channel estimation phase, a first signal resulting from a summation of constant power signals transmitted from the plurality of function variable value transmitters, the summation of the constant power signals being based upon a sum characteristic of a wireless multiple-access channel at the antenna of the function receiver, wherein the constant power signals are first sequences of symbols, for the plurality of function variable value transmitters, a symbols' phase varies differently and randomly, pseudo-randomly, or deterministically with uniform distribution, and a symbols' magnitude is the same for the plurality of function variable value transmitters, and for each of the plurality of function variable value transmitters, the symbols of the first sequence of symbols transmitted from the respective function variable value transmitter are of same magnitude, and, in a normal operating phase, a second signal resulting from a summation of a plurality of second sequences of symbols transmitted from the plurality of function variable value transmitters, the summation of the plurality of second sequences of symbols being based upon the sum characteristic of the wireless multiple-access channel at the antenna of the function receiver, wherein for the plurality of function variable value transmitters, a symbols' phase varies differently and randomly, pseudo-randomly, or deterministically with uniform distribution, and for each of the plurality of function variable value transmitters, a symbols' magnitude is the same for the symbols of the second sequence of symbols transmitted from the respective function variable value transmitter in the normal operating phase and depends on the respective function variable value of the respective function variable value transmitter, over the wireless multiple-access channel at the antenna of the function receiver;

a channel estimator configured to detect a receive power of the first signal during a time in which the first sequences of symbols overlap to acquire a second order statistical moment describing the wireless multiple-access channel based on the first signal; and a function result determiner configured to determine the function result based on a receive power of the second signal and the second order statistical moment, wherein the channel estimator and the function result determiner are implemented using a computer, a programmable logic circuit, or an integrated circuit.

2. The function receiver according to claim 1, wherein the function receiver further comprises several antennas, and the channel estimator is configured to detect a sum of receive powers of the first signal at the several antennas to acquire the second order statistical moment.

3. The function receiver according to claim 1, wherein the function receiver further comprises several antennas and the function result determiner is configured to acquire the function result based on a sum of the receive power of the second multiple-access channel at the several antennas.

4. The function receiver according to claim 1, wherein the function result determiner is configured to correct the receive power of the second signal with an absolute second moment of a channel influence of the wireless multiple-access channel by division.

5. A function variable value transmitter configured to transmit a function variable value together with further function variable values of other function variable value transmitters over a wireless multiple-access channel to a function receiver, and the function variable value transmitter comprising:
a channel estimator configured to estimate a magnitude of a channel influence between the function variable value transmitter and the function receiver from a pilot signal transmitted by the function receiver; and
a transmitter configured to transmit a sequence of symbols, wherein
a symbols' phase varies randomly temporally, pseudo-randomly temporally, or deterministically, with uniform distribution temporally, and
a symbols' magnitude is the same for the symbols of the sequence of symbols transmitted from the function variable value transmitter and depends on the function variable value of the function variable value transmitter, wherein the transmitter is configured to transmit the sequence of symbols
by pre-distorting the symbols in dependence on an inverse of the magnitude of the channel influence, but independent of a phase of the channel influence, and such that a transmit power of the sequence of symbols depends on the function variable value, and
in a temporally overlapping manner with respect to the other function variable value transmitters so that, according to a sum characteristic of the wireless multiple-access channel, a sum of the sequences of symbols is receivable at an antenna of the function receiver, and
wherein the channel estimator is implemented using a computer, a programmable logic circuit, or an integrated circuit.

6. The function variable value transmitters according to claim 5, wherein the function variable value transmitters is configured to detect a physical measurement value and to provide the same as respective function variable value.

7. A system, comprising:
a plurality of function variable value transmitters, wherein each of the plurality of function variable value transmitters is configured to transmit a function variable value together with further function variable values of other function variable value transmitters over a wireless multiple-access channel to a function receiver, wherein each of the plurality of function variable value transmitters is configured:
to transmit, in a channel estimation phase, in a temporally overlapping manner, a constant power signal, wherein the constant power signal is a first sequence of symbols, wherein
for the plurality of function variable value transmitters, a symbols' phase varies differently and randomly, pseudo-randomly, or deterministically with uniform distribution, and
a symbols' magnitude is the same for the plurality of function variable value transmitters,
for each of the plurality of function variable value transmitters, the symbols are of same magnitude, and
the symbols' magnitude of the first sequence of symbols is transmitted from the respective function variable value transmitter so that, according to a sum characteristic of the wireless multiple-access channel, a sum of the constant power signals results at an antenna of the function receiver, and,
to transmit, in a normal operating phase, a second sequence of symbols, wherein
a symbols' phase varies randomly temporally, pseudo-randomly temporally, or deterministically with uniform distribution, temporally,
for each of the plurality of function variable value transmitters, a symbols' magnitude is the same for the symbols of the second sequence of symbols transmitted from the respective function variable transmitter in the normal operating phase and depends on the respective function variable value of the respective function variable value transmitter, without channel-dependent pre-distortion and such that a transmit power of the second sequence of symbols depends on the respective function variable value, and
the second sequence of symbols is transmitted in a temporally overlapping manner so that, according to the sum characteristic of the wireless multiple-access channel, a sum of the constant power signals results at the antenna of the function receiver; and
a function receiver configured to determine a function result of the plurality of function variable values from the plurality of function variable value transmitters, the function receiver including:
an antenna, wherein the function receiver is configured to receive a first signal corresponding to a superposition of constant power signals of the plurality of function variable value transmitters over the wireless multiple-access channel at the receiver, and a second signal corresponding to a superposition of the plurality of second sequences of symbols from the plurality of function variable value transmitters;
a channel estimator configured to detect a receive power of the first signal during a time in which the first sequences of symbols overlap to acquire a second order statistical moment describing the wireless multiple-access channel; and
a function result determiner configured to determine the function result based on a receive power of the second signal and the second order statistical moment,
wherein the channel estimator and the function result determiner are implemented using a computer, a programmable logic circuit, or an integrated circuit.

8. The system according to claim 7, wherein the plurality of function variable value transmitters are configured to subject, in the normal operating phase, the respective function variable value to pre-processing followed by root extraction, to acquire the magnitude of the symbols of the second sequence of symbols of the respective function variable value transmitter, and the function result determiner of the function receiver is configured to subject the receive power of the second signal to post-processing, wherein the plurality of function variable value transmitters and the function result determiner of the function receiver are configured such that, independent of a temporal modification of the wireless multiple-access channel and for all possible values that the function variable values can assume, the function result represents a geometric or arithmetic average of the function variable values.

9. A system, comprising:
 a plurality of function variable value transmitters, wherein each of the plurality of function variable value transmitters is implemented to transmit a function variable value together with further function variable values of other function variable value transmitters over a wireless multiple-access channel to a function receiver, and includes:
  a channel estimator configured to estimate a magnitude of a channel influence between the respective function variable value transmitter and the function receiver from a pilot signal transmitted by the function receiver; and
  a transmitter configured to transmit a sequence of symbols, wherein
   a symbols' phase varies randomly temporally, pseudo-randomly temporally, or deterministically, with uniform distribution temporally, and
   for each of the plurality of function variable transmitters, a symbols' magnitude is the same for the symbols of the sequence of symbols transmitted from the respective function variable value transmitter and depends on the respective function variable value of the respective function variable value transmitter, by pre-distorting the symbols in dependence on an inverse of the magnitude of the channel influence, but independent of a phase of the channel influence, and such that a transmit power of the sequence of symbols depends on the function variable value, in a temporally overlapping manner so that, according to a sum characteristic of the wireless multiple-access channel, a sum of the sequences of symbols results at an antenna of the function receiver; and
 a function receiver configured to determine a function result of the plurality of function variable values from the plurality of function variable value transmitters, the function receiver comprising:
  an antenna, wherein the function receiver is configured to receive a signal corresponding to a sum of the plurality of sequences of symbols from the plurality of function variable value transmitters over the wireless multiple-access channel at the receiver; and
  a function result determiner configured to determine the function result based on a receive power of the signal; and
  a pilot transmitter configured to transmit the pilot signal, wherein the channel estimator and the function result determiner are implemented using a computer, a programmable logic circuit, or an integrated circuit.

10. The system according to claim 9, wherein the plurality of function variable value transmitters are configured to subject the respective function variable value to pre-processing followed by root extraction and a multiplication with the inverse of the magnitude of the channel influence between the respective function variable value transmitter and the function receiver for pre-distorting the symbols of the sequence of symbols of the respective function variable value transmitter, to acquire the magnitude of the symbols of the sequence of symbols of the respective function variable value transmitter, and the function result determiner of the function receiver is configured to subject the receive power of the signal to post-processing, wherein the plurality of function variable value transmitters and the function result determiner of the function receiver are configured such that, independent of a temporal modification of the wireless multiple-access channel and for all possible values that the function variable values can assume, the function result represents a geometric or arithmetic average of the function variable values.

11. A method for determining a function result of a plurality of function variable values from a plurality of function variable value transmitters at a receiver, comprising:
 receiving, in a channel estimation phase, a first signal resulting from a summation of constant power signals transmitted from the plurality of function variable value transmitters, the summation of the constant power signals being based upon a sum characteristic of a wireless multiple-access channel at an antenna of the function receiver, wherein
  the constant power signals are first sequences of symbols,
  for the plurality of function variable value transmitters, a symbols' phase varies differently and randomly, pseudo-randomly, or deterministically with uniform distribution, and a symbols' magnitude is the same for the plurality of function variable value transmitters, and
  for each of the plurality of function variable value transmitters, the symbols of the first sequence of symbols transmitted from the respective function variable value transmitter are of same magnitude, and,
 receiving, in a normal operating phase, a second signal resulting from a summation of a plurality of second sequences of symbols transmitted from the plurality of function variable value transmitters, the summation of the plurality of second sequences of symbols being based upon the sum characteristic of the wireless multiple-access channel at the antenna of the function receiver, wherein
  for the plurality of function variable value transmitters, a symbols' phase varies differently and randomly, pseudo-randomly, or deterministically with uniform distribution, and
  for each of the plurality of function value transmitters, a symbols' magnitude is the same for the symbols of the second sequence of symbols transmitted from the respective function variable value transmitters in the normal operating phase and depends on the respective function variable value of the respective function variable value transmitter, over the wireless multiple-access channel at the antenna of the function receiver;
 detecting a receive power of the first signal during a time in which the first sequences of symbols overlap to acquire a second order statistical moment describing the wireless multiple-access channel based on the first signal; and
 determining the function result based on a receive power of the second signal and the second order statistical moment.

12. A method for operating a plurality of function variable value transmitters, wherein each of the plurality of function variable value transmitters is implemented to transmit a function variable value together with further function variable values of other function variable value transmitters over a wireless multiple-access channel to a function receiver, comprising:

in a channel estimation phase, transmitting a constant power signal, in a temporally overlapping manner from every function variable value transmitter, so that the constant power signal is a first sequence of symbols, wherein for the plurality of function variable value transmitters, a symbols' phase varies differently and randomly, pseudo-randomly, or deterministically with uniform distribution, and a symbols' magnitude is the same for the plurality of function variable value transmitters, and for each of the plurality of function variable value transmitters, the symbols of the first sequence of symbols transmitted from the respective function variable value transmitter are of same magnitude so that, according to a sum characteristic of the wireless multiple-access channel, a summation of the constant power signals is receivable at an antenna of the function receiver; and in a normal operating phase, transmitting a second sequence of symbols, wherein a symbols' phase varies randomly temporally, pseudo-randomly temporally, or deterministically, with uniform distribution, temporally, and for each of the plurality of function variable value transmitters, a symbols' magnitude is the same for the symbols of the second sequence of symbols transmitted from the respective function variable value transmitter in the normal operating phase and depends on the respective function variable value of the respective function variable value transmitter, without channel-dependent pre-distortion, and such that a transmit power of the second sequence of symbols depends on the function variable value of the respective function variable value transmitter, and in a temporally overlapping manner so that, according to the sum characteristic of the wireless multiple-access channel, a sum of the second sequences of symbols is receivable at the antenna of the function receiver.

13. A method for operating a plurality of function variable value transmitters, wherein each of the plurality of function variable value transmitters is implemented to transmit a function variable value together with further function variable values of other function variable value transmitters over a wireless multiple-access channel to a function receiver, comprising:

estimating, at each function variable value transmitter of the plurality of functional variable value transmitters, a magnitude of a channel influence between the respective function variable value transmitter and the function receiver from a pilot signal transmitted by the function receiver; and transmitting a sequence of symbols, wherein a symbols' phase varies randomly temporally, pseudo-randomly temporally, or deterministically, with uniform distribution temporally, and a symbols' magnitude is the same for the symbols of the sequence of symbols transmitted from a respective function variable value transmitter and depends on the respective function variable value of the respective function variable value transmitter, by pre-distorting the symbols in dependence on an inverse of the magnitude of the channel influence, but independent of a phase of the channel influence, and such that a transmit power of the sequence of symbols depends on the function variable value, and in a temporally overlapping manner so that, according to a sum characteristic of the wireless multiple-access channel, a sum of the sequences of symbols is receivable at an antenna of the function receiver.

14. A non-transitory tangible computer-readable medium including a computer program comprising a program code for performing, when the program runs on a computer, the method for operating a plurality of function variable value transmitters, wherein each of the plurality of function variable value transmitters is implemented to transmit a function variable value together with further function variable values of other function variable value transmitters over a wireless multiple-access channel to a function receiver, the method comprising:

in a channel estimation phase, transmitting a constant power signal, in a temporally overlapping manner from every function variable value transmitter, so that the constant power signal is a first sequence of symbols, wherein, for the plurality of function variable value transmitters, a symbols' phase varies differently and randomly, pseudo-randomly, or deterministically with uniform distribution, and a symbols' magnitude is the same for the plurality of function variable value transmitters, and for each of the plurality of function variable value transmitters, the symbols of the first sequence of symbols transmitted from the respective function variable value transmitter so that, according to a sum characteristic of the wireless multiple-access channel, a sum of the constant power signals is receivable at an antenna of the function receiver; and in a normal operating phase, transmitting a second sequence of symbols, wherein a symbols' phase varies randomly temporally, pseudo-randomly temporally, or deterministically, with uniform distribution, temporally, and for each of the plurality of function variable value transmitters, a symbols' magnitude is the same for the symbols of the second sequence of symbols transmitted from the respective function variable value transmitter in the normal operating phase and depends on the respective function variable value of the respective function variable value transmitter, without channel-dependent pre-distortion, and such that a transmit power of the second sequence of symbols depends on the function variable value of the respective function variable value transmitter, and in a temporally overlapping manner so that, according to the sum characteristic of the wireless multiple-access channel, a sum of the second sequences of symbols is receivable at the antenna of the function receiver.

15. A non-transitory tangible computer-readable medium including a computer program comprising a program code for performing, when the program runs on a computer, the method for operating a plurality of function variable value transmitters, wherein each of the plurality of function variable value transmitters is implemented to transmit a function variable value together with further function variable values of other function variable value transmitters over a wireless multiple-access channel to a function receiver, the method comprising:

estimating, at each function variable value transmitter of the plurality of functional variable value transmitters, a magnitude of a channel influence between the respective function variable value transmitter and the function receiver from a pilot signal transmitted by the function receiver; and transmitting a sequence of symbols, wherein
- a symbols' phase varies randomly temporally, pseudo-randomly temporally, or deterministically, with uniform distribution temporally, and
- a symbols' magnitude is the same for the symbols of the sequence of symbols transmitted from a respective function variable value transmitter and depends on the respective function variable value of the respective function variable value transmitter, by pre-distorting the symbols in dependence on an inverse of the magnitude of the channel influence, but independent of a phase of the channel influence, and such that a transmit power of the sequence of symbols depends on the function variable value, and in a temporally overlapping manner so that, according to a sum characteristic of the wireless multiple-access channel, a sum of the sequences of symbols is receivable at an antenna of the function receiver.

16. The function variable value transmitters according to claim 5, wherein the function variable value transmitters is configured to detect a physical measurement value and to provide the same as the respective function variable value.

* * * * *